US010725975B2

(12) United States Patent
Minagawa

(10) Patent No.: US 10,725,975 B2
(45) Date of Patent: Jul. 28, 2020

(54) NON-TRANSITORY COMPUTER-READABLE MEDIUM, SYSTEM, AND INFORMATION PROCESSING METHOD

(71) Applicant: CANON KABUSHIKI KAISHA, Tokyo (JP)

(72) Inventor: Tomonori Minagawa, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 348 days.

(21) Appl. No.: 15/783,050

(22) Filed: Oct. 13, 2017

(65) Prior Publication Data
US 2018/0113879 A1  Apr. 26, 2018

(30) Foreign Application Priority Data
Oct. 25, 2016  (JP) ................. 2016-208846

(51) Int. Cl.
H04N 21/44 (2011.01)
G06F 16/178 (2019.01)
G06F 9/54 (2006.01)
G06F 11/30 (2006.01)
G06F 11/00 (2006.01)
H04L 29/08 (2006.01)
G06F 11/34 (2006.01)

(52) U.S. Cl.
CPC ............ *G06F 16/178* (2019.01); *G06F 9/542* (2013.01); *G06F 11/004* (2013.01); *G06F 11/3006* (2013.01); *G06F 11/3419* (2013.01); *H04L 67/06* (2013.01); *G06F 11/302* (2013.01); *G06F 2201/81* (2013.01); *G06F 2201/865* (2013.01); *G06F 2201/88* (2013.01)

(58) Field of Classification Search
CPC .................................. H04N 21/44204
USPC ......................................... 707/688
See application file for complete search history.

(56) References Cited

U.S. PATENT DOCUMENTS 7,145,688 B2   12/2006  Minagawa
8,601,149 B2*  12/2013  Ando ............... G11B 20/00086
                                              709/231
8,949,653 B1    2/2015  Kayan et al.
(Continued)

FOREIGN PATENT DOCUMENTS

EP     2434401 A1    3/2012
JP     2004038759 A  2/2004
WO     2012033773 A2 3/2012

OTHER PUBLICATIONS

Quora.com, "What is a scripting language? In what are they important?", May 2015, pp. 1-4, https://www.quora.com/What-is-a-scripting-language-In-what-are-they-important(Year 2015).
(Continued)

Primary Examiner — Baoquoc N To
(74) Attorney, Agent, or Firm — Venable LLP

(57) ABSTRACT

In a system that sends and receives one or more data files and a statistics information file that holds information of the total number of those data files, event processing is not carried out each time a file arrives. Instead, event processing is carried out on all of the files in response to an event of the statistics information file arriving, which reduces the number of times event processing is executed. The amount of time that has elapsed in the event processing is monitored, and the processing is continued by executing different event processing before a timeout occurs.

10 Claims, 29 Drawing Sheets

(56) References Cited

U.S. PATENT DOCUMENTS

| | | | |
|---|---|---|---|
| 2004/0153866 A1 | 8/2004 | Guimbellot et al. | |
| 2004/0255296 A1* | 12/2004 | Schmidt | G06F 9/4887 718/100 |
| 2008/0155387 A1 | 6/2008 | Yabe | |
| 2012/0254291 A1* | 10/2012 | Feldman | G06Q 10/06 709/203 |
| 2013/0054745 A1* | 2/2013 | Ando | G11B 27/105 709/217 |

OTHER PUBLICATIONS

U.S. Copending, unpublished U.S. Appl. No. 15/783,061, filed Oct. 13, 2017 to Kenta Yabe.

* cited by examiner

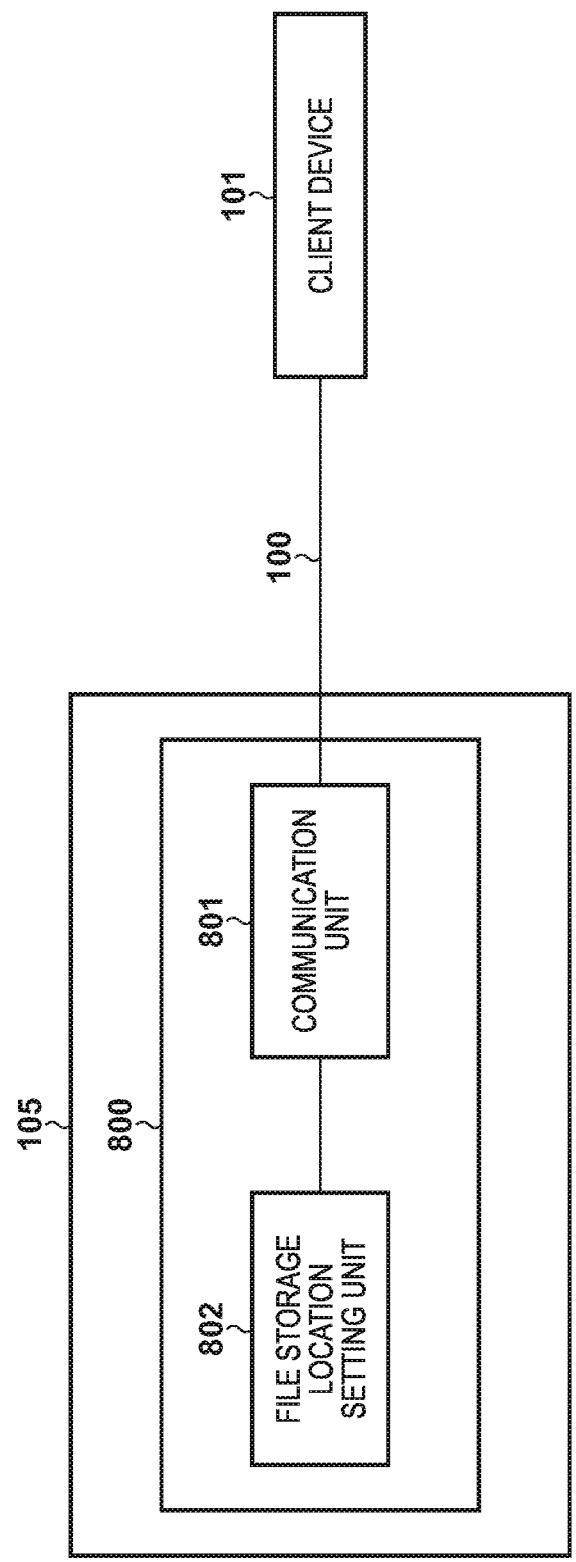

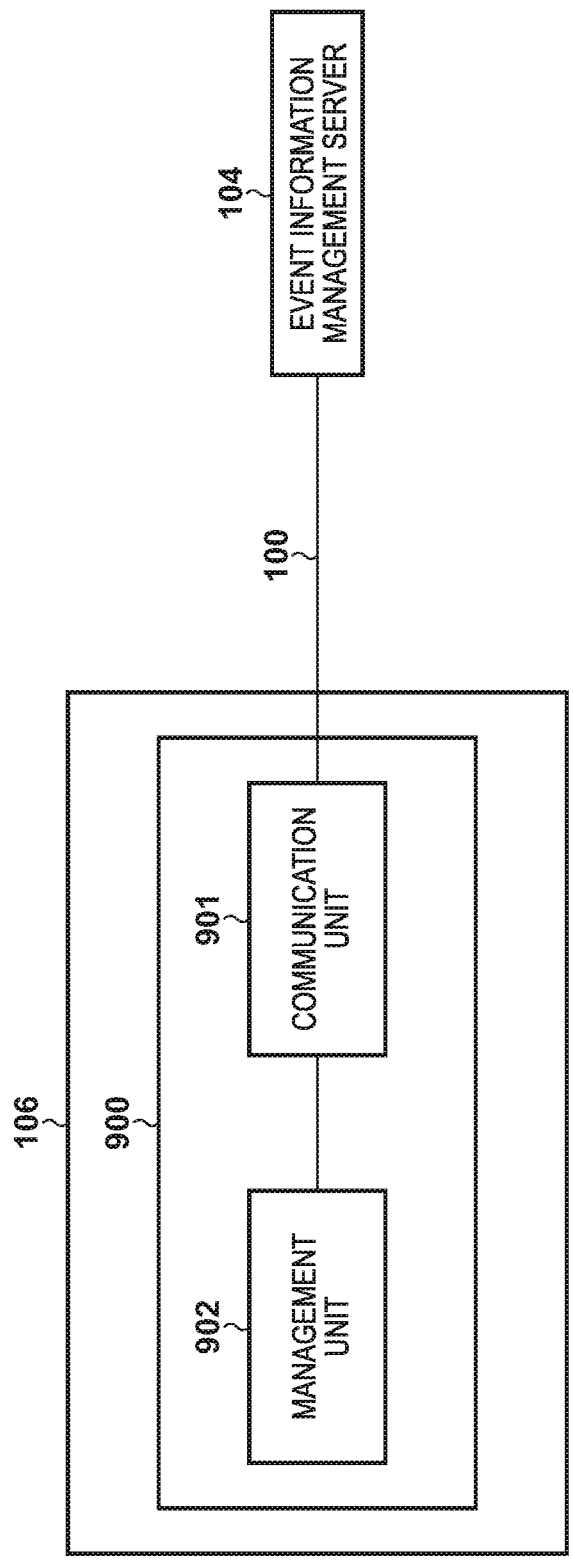

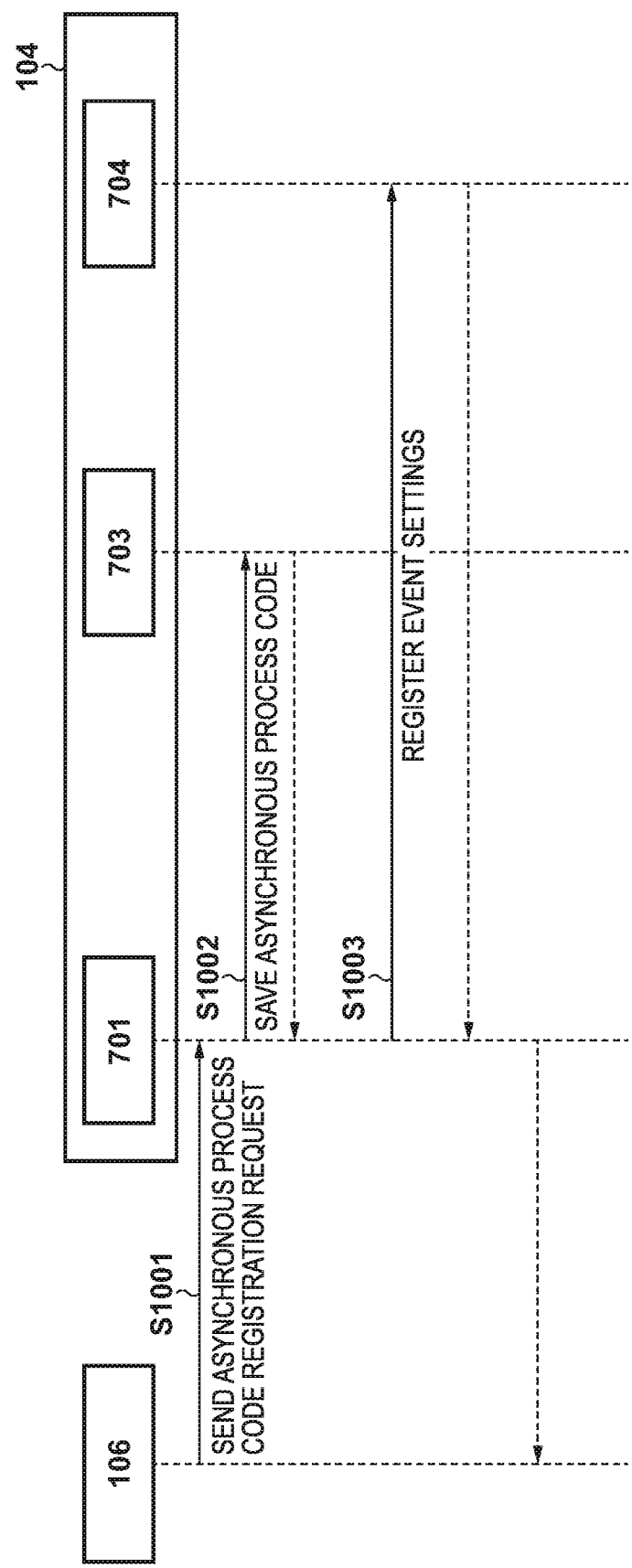

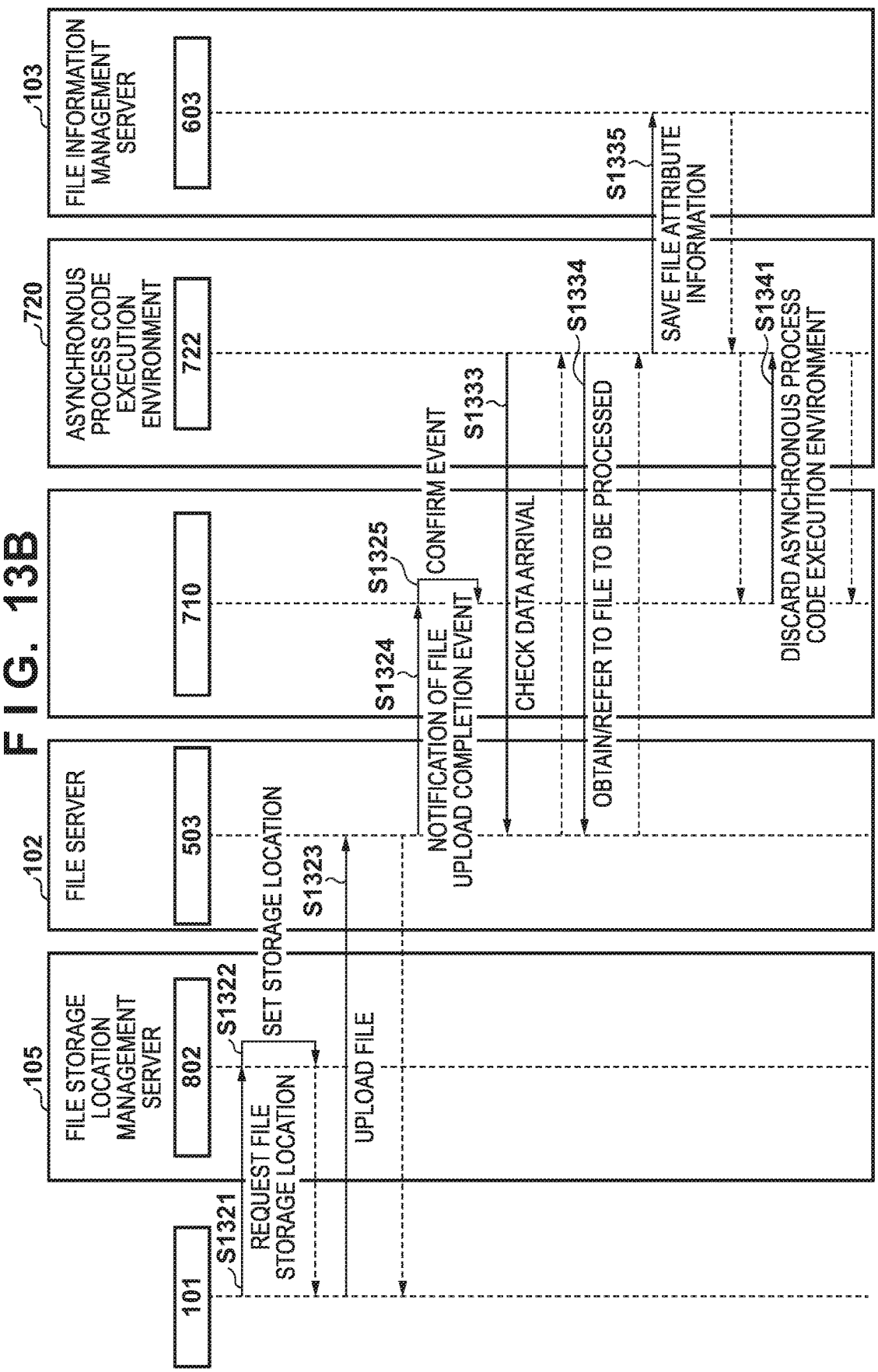

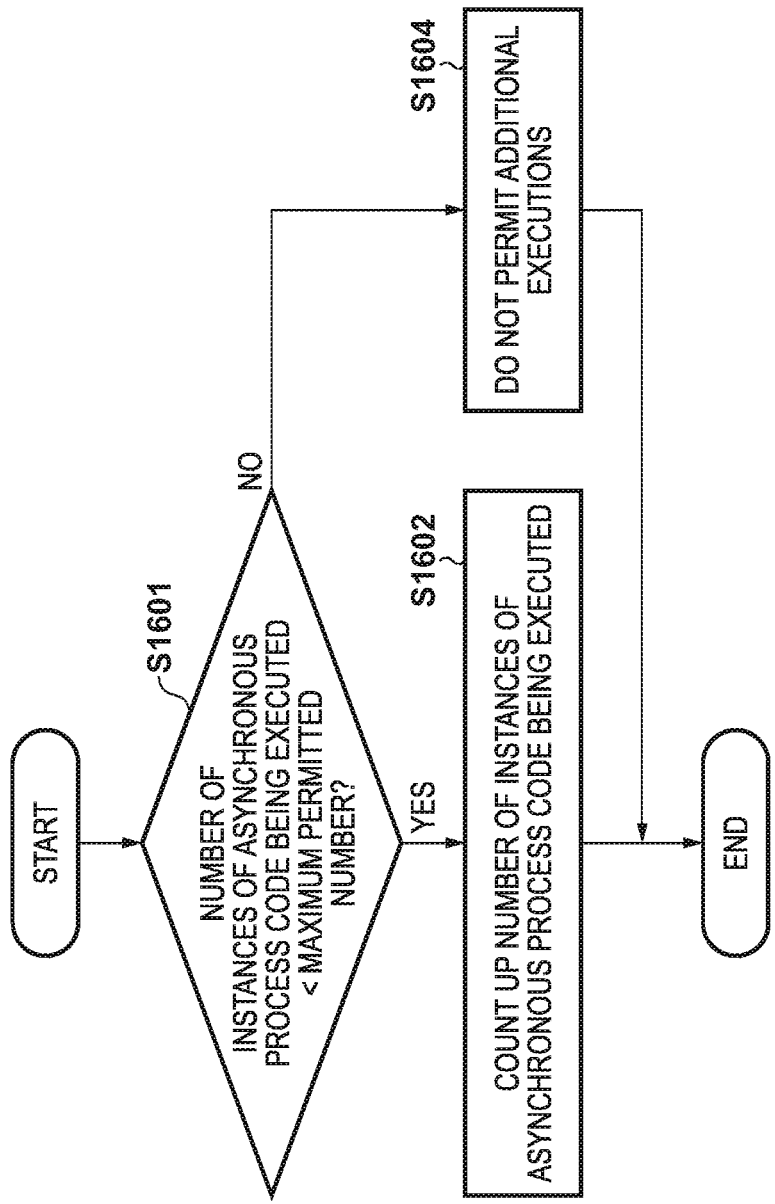

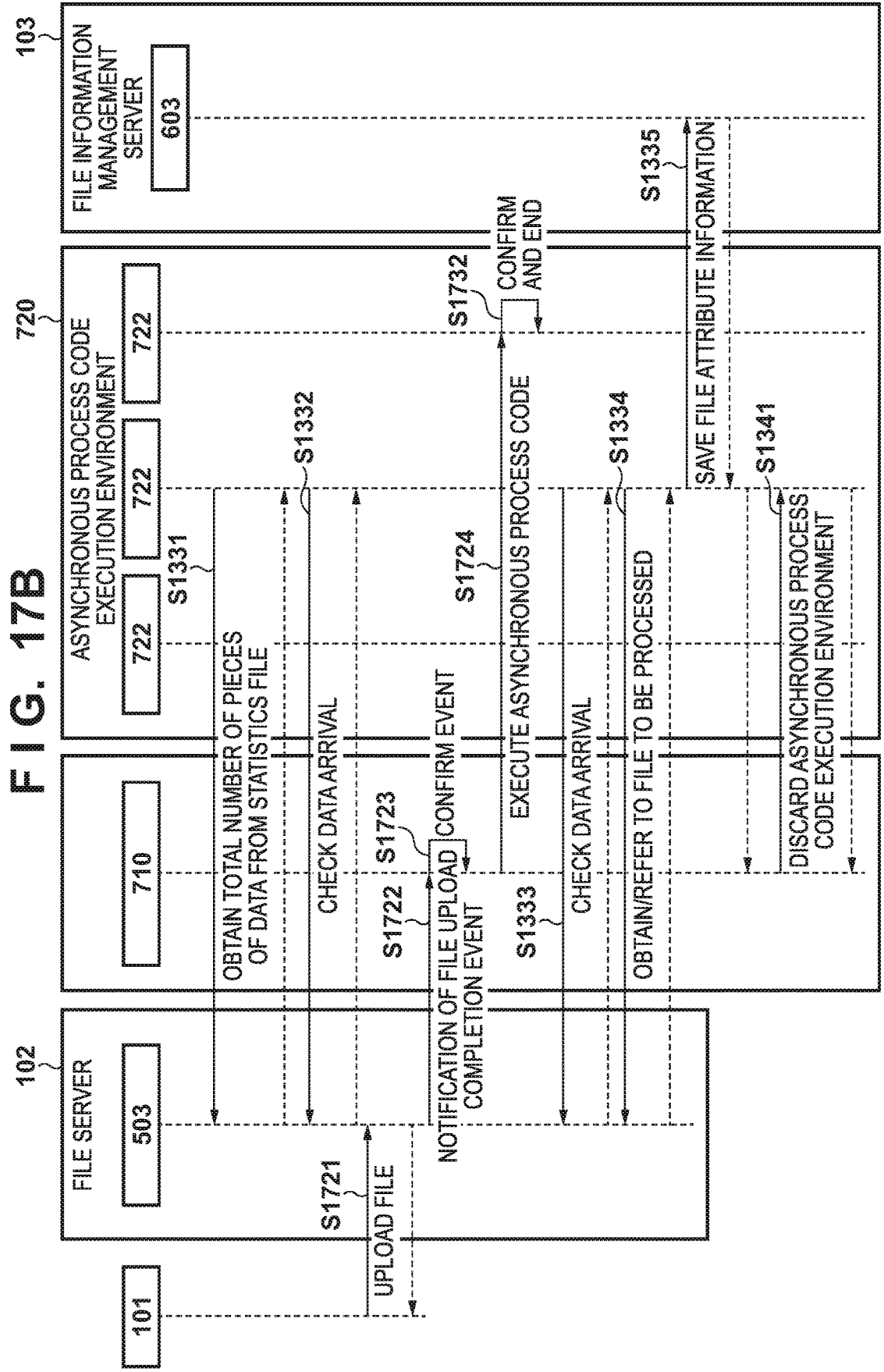

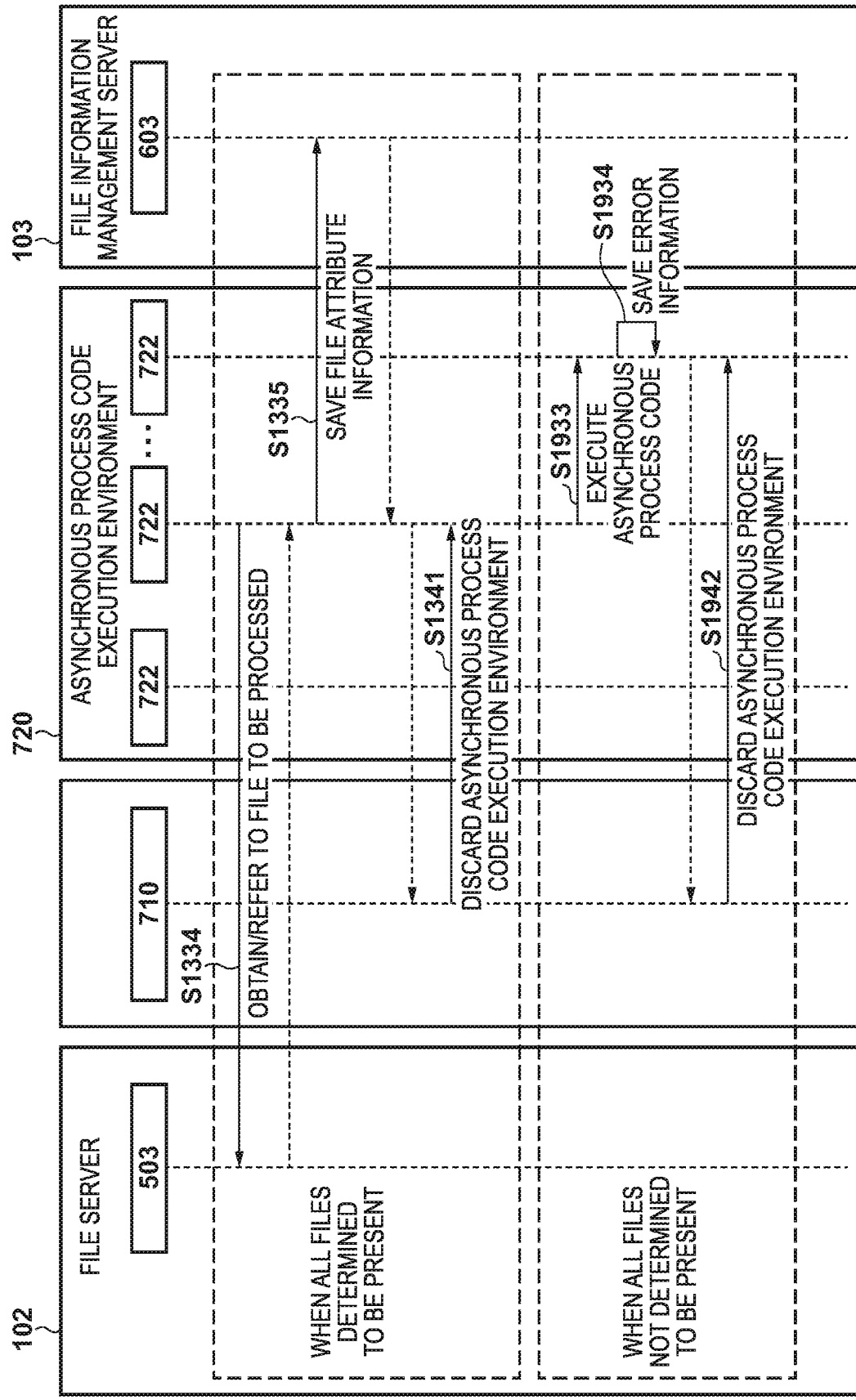

NON-TRANSITORY COMPUTER-READABLE MEDIUM, SYSTEM, AND INFORMATION PROCESSING METHOD

BACKGROUND OF THE INVENTION

Field of the Invention

The invention relates to a non-transitory computer-readable medium, system and information processing method, and particularly relates to an event-driven computing service in a cloud service.

Description of the Related Art

Various types of cloud computing services have become available in recent years. Amazon Web Service (abbreviated as "AWS" hereinafter), Google Cloud Platform, and Microsoft Azure can be given as examples of such services. These services have become widespread by providing computing resources such as virtual machines and storage as services that are billed by the hour in accordance with the specifications, storage, and so on used. By using such a service, a user can flexibly create information processing systems such as web systems at low cost, without having to possess the necessary physical resources him/herself. Collecting log information, operation information, and so on of devices and applications from various devices, mobile terminals, and computer terminals connected to a network, placing the information in storage, and managing the information in a database can be given as a usage example of such a cloud computing service. Here, a record is created each time information (a file or the like) is uploaded, and the filename, storage location, and so on are managed.

Japanese Patent Laid-Open No. 2004-38759, for example, discloses a technique called an "event-driven script". According to this technique, in the case where specific data has been updated, a pre-registered script is launched in accordance with the update event. Cloud computing services also provide services capable of low-load processing in response to the occurrence of an event such as a file being uploaded (called an "event-driven computing service" hereinafter). Amazon Lambda, Google Cloud Functions, and Azure Functions are examples. With these services, program code for implementing desired processing is registered for a cloud computing service, and thus processing can be executed in accordance with the registered program code in response to the occurrence of an event, such as a file being received, a DB table being updated, a custom event generated by an application or a device, and so on.

To implement such processing, it has thus far been necessary for a user of a cloud computing service to carry out polling for detecting events, provide an application for executing desired processing, and so on, and to construct and manage infrastructure for running that application. However, the above-described event-driven computing service provides infrastructure for executing polling processes for detecting events and executing program code for implementing desired processes on the cloud computing service side. It has therefore become easy for a user of a cloud computing service to implement event processing.

In the current Amazon Lambda, for example, there are limitations on the number of events that can be processed simultaneously by a single account (that is, the number of event-driven computing services being run at the same time). There is a problem in that when the number of events being processed as reached this limit, the event-driven computing service will not be started by the cloud computing service even when the next event occurs. In other words, when a large amount of information is uploaded and many events occur, there is a risk of processing failures arising. For example, when log information, operation information, or the like is uploaded, multiple log files are sometimes sent from a single terminal at once. When an event-driven computing service that uses such an upload as a trigger is registered, the above-described processing failure occurs more easily in the case where an extremely large number of files are uploaded, and when many files are sent concurrently from multiple terminals.

SUMMARY OF THE INVENTION

The invention reduces the risk of processing failures in an event-driven computing service caused by the number of events that have occurred exceeding a limit number.

The present invention has the following configuration.

According to a first aspect of the invention, there is provided a non-transitory computer-readable medium storing a program executed by a computer included in a system in accordance with a system event and computing resources specified during registration in the system, wherein when the program is executed by the computer, and the program is executed in response to each of a plurality of system events occurring in response to a plurality of pieces of related data being received, the program: controlling, in the case where the data that is a processing target of the program is predetermined data, the processing of at least one of the plurality of pieces of data aside from the data that is the processing target; and ending, in the case where the data that is the processing target is not the predetermined data, the processing of the program without waiting for the processing of the data that is the processing target to complete.

According to a second aspect of the invention, there is provided a system that provides a service that in response to a system event automatically executes a script registered in advance with computing resources designated for the script, the system comprising: a detection unit that detects the system event; an execution unit that executes the script in response to the detected system event; and a control unit that, when the script is executed in response to each of a plurality of system events occurring in response to a plurality of pieces of related data being received, controls, in the case where the data that is a processing target of the script is predetermined data, the processing of at least one of the plurality of pieces of data aside from the data that is the processing target, wherein in the case where the data that is the processing target is not the predetermined data, the processing of the script is ended without waiting for the processing of the data that is the processing target to complete.

According to a third aspect of the invention, there is provided an information processing method in a system that provides a service that in response to a system event automatically executes a script registered in advance with computing resources designated for the script, the method comprising: detecting the system event; executing the script in response to the detected system event; and when the script is executed in response to each of a plurality of system events occurring in response to a plurality of pieces of related data being received, controlling, in the case where the data that is a processing target of the script is predetermined data, the processing of at least one of the plurality of pieces of data aside from the data that is the processing target, wherein in the case where the data that is the processing target is not the predetermined data, the processing of the script is ended without waiting for the processing of the data that is the processing target to complete.

According to the invention, the risk of processing failures in an event-driven computing service caused by the number of events that have occurred exceeding a limit number is reduced.

Further features of the present invention will become apparent from the following description of exemplary embodiments (with reference to the attached drawings).

BRIEF DESCRIPTION OF THE DRAWINGS

FIG. 8 is a diagram illustrating the software configuration of a file storage location management server 105.

FIG. 9 is a diagram illustrating the software configuration of an administrator device 106.

FIG. 10 is a sequence chart illustrating a series of processes for registering asynchronous process code.

FIGS. 13A and 13B are sequence charts illustrating a first embodiment.

FIG. 16 is a flowchart of step S1117.

FIGS. 17A and 17B are sequence charts illustrating a second embodiment.

FIGS. 19A and 19B are sequence charts illustrating a third embodiment.

DESCRIPTION OF THE EMBODIMENTS

First Embodiment

System Configuration

Figure 1:
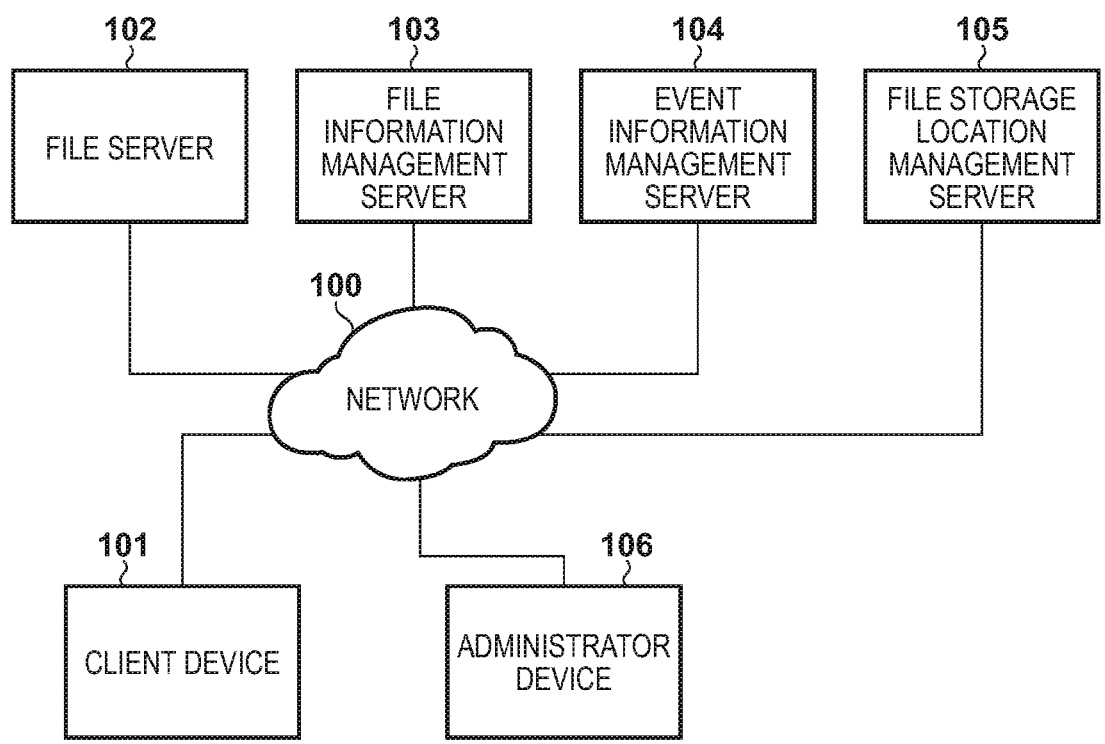
FIG. 1 is a diagram illustrating the overall configuration of a system.

Hereinafter, embodiments of the invention will be described with reference to the drawings. FIG. 1 is a block diagram illustrating the overall configuration of a system according to the invention. A network 100 is a network connecting the constituent elements in the block diagram of FIG. 1, namely a client device 101, a file server 102, a file information management server 103, an event information management server 104, a file storage location management server 105, and an administrator device 106. The client device and servers, administrator devices, and so on may also be referred to as "information processing apparatuses" or "computers". The system illustrated in FIG. 1 may be referred to as a "cloud system" or an "information processing system".

The network 100 is a framework through which the constituent elements communicate with each other. In this embodiment, the client device 101 will be described as being connected to the other constituent elements over the internet. The other constituent elements, meanwhile, may be connected over an intranet, the internet, or another network system. Of the constituent elements illustrated in the block diagram of FIG. 1, the client device 101 is mutually connected to the file server 102 over the network 100. While this embodiment assumes the client device 101 is a personal computer ("PC" hereinafter), the client device 101 may be any type of terminal having a function for communicating over the network 100, including a mobile terminal, a photocopier, and the like. The file server 102 is a server device that receives and saves actual files sent from the client device 101. The file server 102 has a function for saving files in a variety of formats sent from the client device 101. The file information management server 103 is a server device that saves attribute information of files sent from the client device 101 in association with information indicating the location where the file is stored in the file server 102 (a URL).

The event information management server 104 is a server device that manages and executes program code in an event-driven computing service. A user of the event-driven computing service registers program code and an event to occur in the file server 102 for executing that program code in association with each other in the event information management server 104. "Event" refers to an operation made by the client device 101 or another constituent element illustrated in FIG. 1 on a file saved in the file server 102, such as a file being uploaded to a predetermined path in the file server 102, a file saved in a predetermined path in the file server 102 being updated, and so on. Environment information of a virtual machine executing the program code is also registered in association with the code. This refers specifically to the specifications of the CPU, RAM, and so on operating in the virtual machine. By doing so, when an event occurs in the file server 102, the event information management server 104 executes predetermined program code associated with the event asynchronously from the process executed in the file server 102. Hereinafter, program code executed by the event information management server 104 in response to an event occurring in the file server 102 will be referred to as "asynchronous process code". Additionally, the "event" according to this embodiment will also be referred to as a "system event". The type of an event and the asynchronous process code are designated and associated when event information is registered, for example. The asynchronous process code is executed using the computing resources of the event information management server 104 executing the asynchronous process code. The asynchronous process code is implemented using script such as Javascript (trade name), for example.

Note that there are limitations with respect to the environment for executing this asynchronous process code. Two examples of limitations will be given here. One is an upper limit on the number of instances of asynchronous process code that can be executed simultaneously. In the case where many events occur almost simultaneously, processing implemented by executing asynchronous process code will run for events within an execution permitted number, which serves as the upper limit. However, once the execution permitted number is exceeded, the processing for any events that follow thereafter may fail. The other is an upper limit on the processing time for asynchronous process code. That is, in the case where the processing for an event is not completed within a permitted processing time, that asynchronous process code will have a timeout error and be interrupted.

The file storage location management server 105 is a server that sets a storage location in the file server 102 for a file in response to a request from the client device 101 and returns that storage location. The storage location of the file is determined from an identifier of the client device that sent the file, the type of the file, the filename, and so on. Note that the client device 101 can also inquire with the file storage location management server 105 as to the storage location when uploading a file to the file server 102, a storage location determined statically for each application in advance may be used. The administrator device 106 is a PC connected to the event information management server 104, and can make a request to register asynchronous process code to the event information management server 104.

Terminal and Server Hardware Configuration

Figure 2:
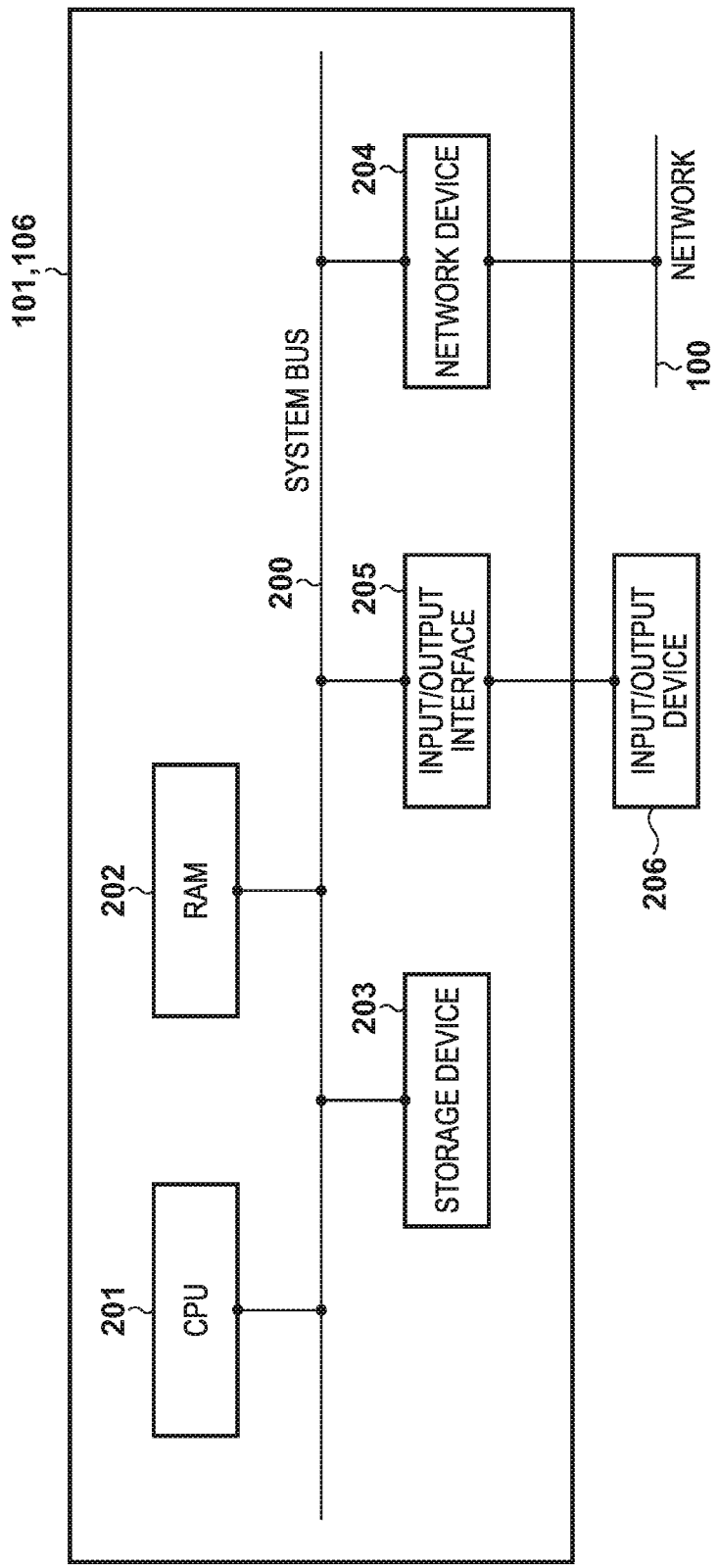
FIG. 2 is a diagram illustrating the hardware configuration of a client device 101 and an administrator device 106.

FIG. 2 is a block diagram illustrating an example of the hardware configuration of the client device 101 and the administrator device 106 illustrated in FIG. 1. A system bus 200 is a bus connecting the hardware elements constituting the client device 101 to each other. Unless specified otherwise, this embodiment assumes that the system bus 200 conveys control commands from a CPU 201 to the various hardware elements connected to the system bus 200. The CPU 201 executes programs loaded from RAM 202 and a storage device 203, and directly or indirectly controls the hardware elements of the client device 101 that are connected by the system bus 200 in order to realize the invention according to this embodiment. The RAM 202 is a temporary memory region used as a work region for the CPU 201 to operate. The storage device 203 is an external storage device, such as an HDD, that stores an OS, which is basic software, as well as other software modules. A network device 204 is hardware that connects to the network 100 to communicate with other devices. An input/output interface 205 is an interface for connecting to an input/output device 206. The input/output interface 205 includes, for example, PS2, Universal Serial Bus (USB), an analog or digital display interface, and so on. The input/output device 206 is a device that connects to the client device 101 via the input/output interface 205 and inputs/outputs information. The input/output device 206 is a display, a keyboard, a mouse, or the like, for example.

Figure 3:
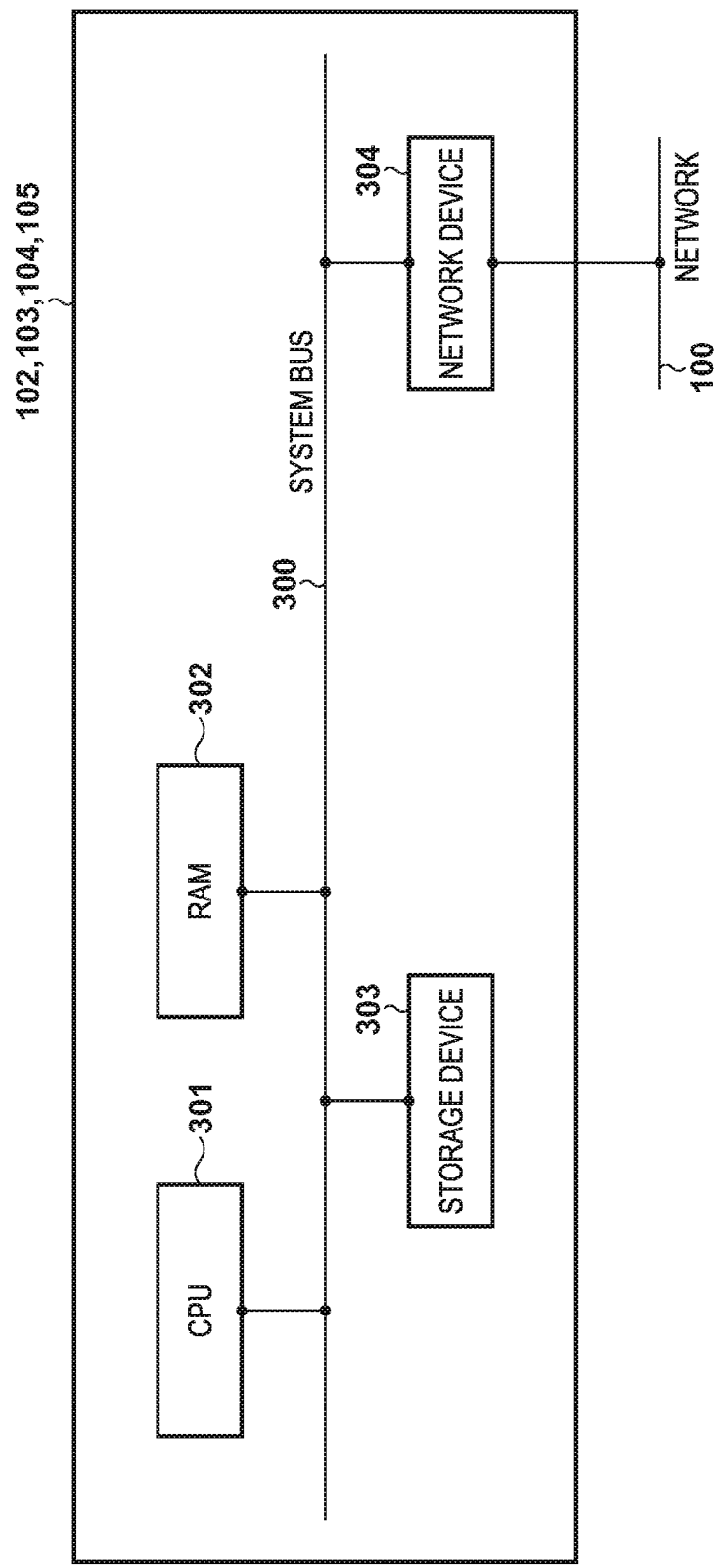
FIG. 3 is a diagram illustrating the hardware configuration of each of servers 102, 103, 104 and 105.

FIG. 3 is a block diagram illustrating an example of the hardware configuration of the file server 102, the file information management server 103, the event information management server 104, and the file storage location management server 105 illustrated in FIG. 1. A system bus 300 is a bus connecting the hardware elements constituting the file server 102, the file information management server 103, or the event information management server 104 to each other. Unless specified otherwise, this embodiment assumes that the system bus 300 conveys control commands from a CPU 301 to the various hardware elements connected to the system bus 300. The CPU 301 executes programs loaded from RAM 302 and a storage device 303, and directly or indirectly controls the hardware elements of the client device 101 that are connected by the system bus 300 in order to realize the invention according to this embodiment. The RAM 302 is a temporary memory region used as a work region for the CPU 301 to operate. The storage device 303 is an external storage device, such as an HDD, that stores an OS, which is basic software, as well as other software modules. A network device 304 is hardware that connects to the network 100 to communicate with other devices. The file server 102, the file information management server 103, the event information management server 104, and the file storage location management server 105 illustrated in FIG. 1 are provided as a cloud computing service. The hardware elements illustrated in FIG. 3 are implemented as application software by virtual machine software, and behave in the same manner as physical hardware elements.

Client Software

Figure 4:
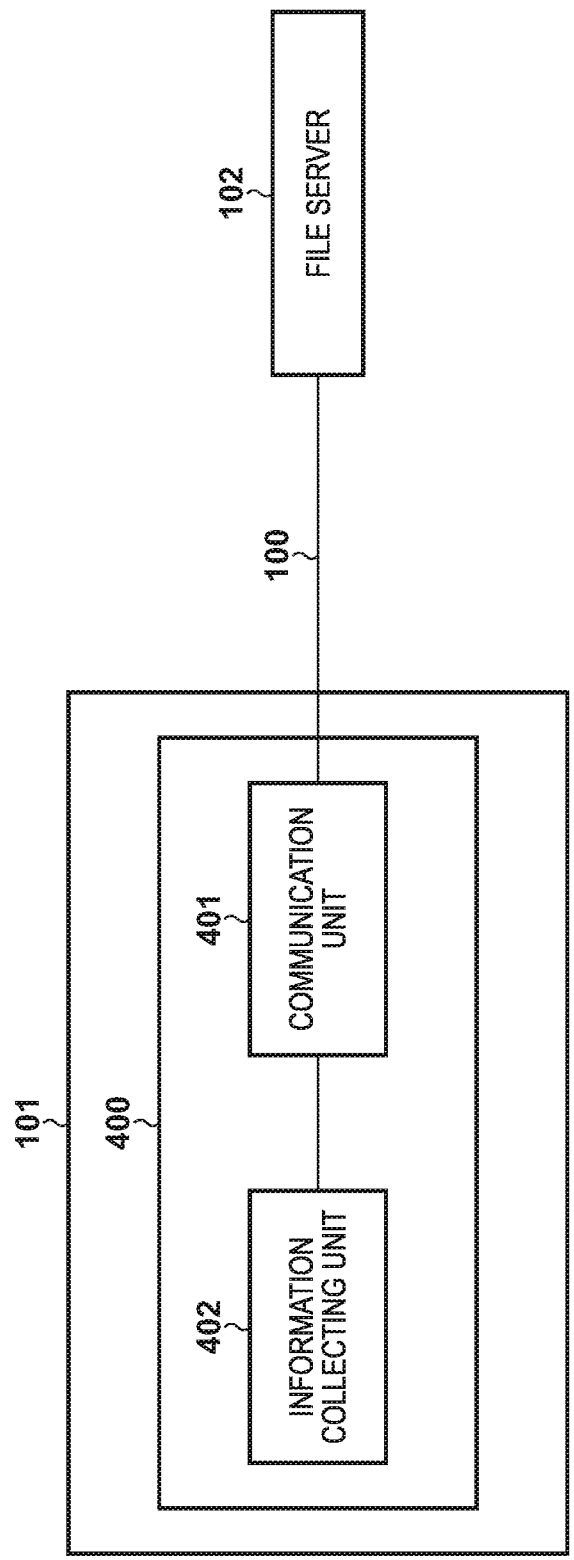
FIG. 4 is a diagram illustrating the software configuration of the client device 101.

FIG. 4 is a block diagram illustrating an example of the software configuration of a client device information transmission application 400 that runs on the client device 101 according to this embodiment. The client device information transmission application 400 is stored in the storage device 203 of the client device 101 and is executed by the CPU 201. The client device information transmission application 400 is constituted of a communication unit 401 and an information collecting unit 402. The communication unit 401 communicates with the file server 102 via the network device 204. The information collecting unit 402 collects client device information generated by the client device 101 and saves that information as a file in the storage device 203. Specifically, the information collecting unit 402 sequentially saves hardware log information and the like output by the client device 101 as files in the storage device 203. The client device information transmission application 400 sends the client device information to the file server 102 via the communication unit 401.

File Server Software

Figure 5:
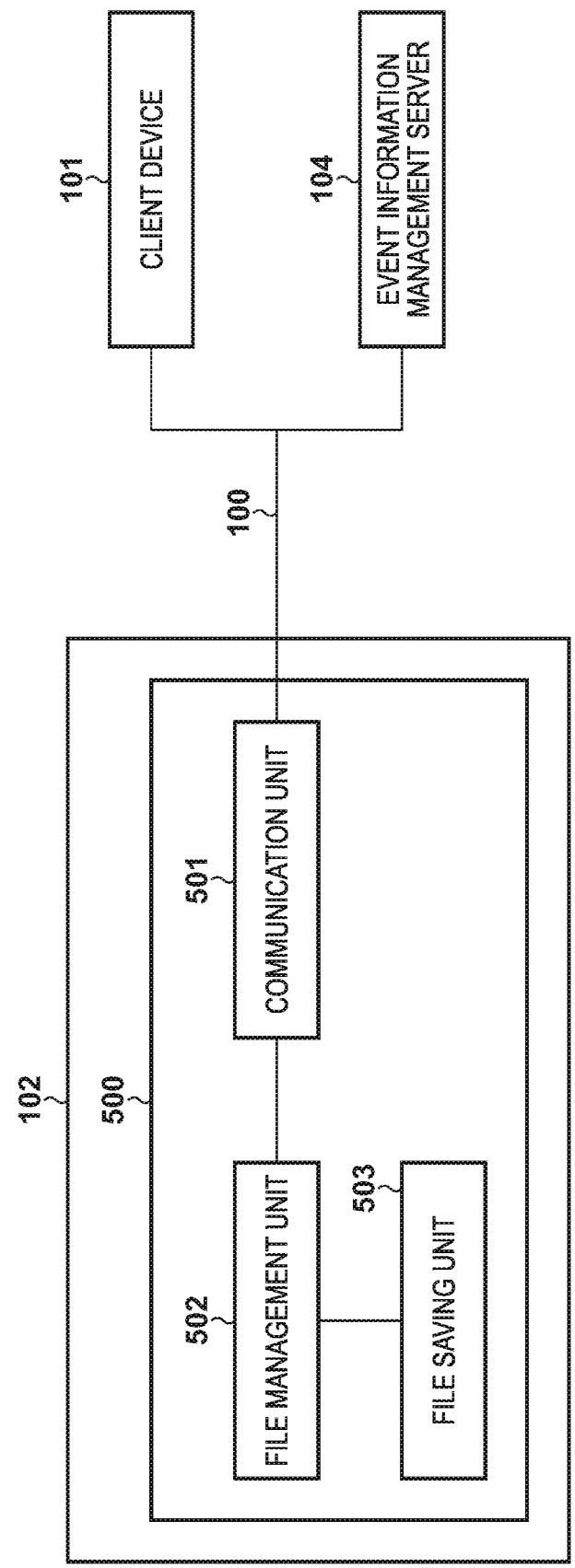
FIG. 5 is a diagram illustrating the software configuration of a file server 102.

FIG. 5 is a block diagram illustrating an example of the software configuration of a file management application 500 that runs on the file server 102 according to this embodiment. The file management application 500 is stored in the storage device 303 of the file server 102 and executed by the CPU 301. The file management application 500 is constituted of a communication unit 501, a file management unit 502, and a file saving unit 503. The communication unit 501 communicates with the client device 101 and the event information management server 104 via the network device 304. The file management unit 502 receives a request from the client device 101 and the event information management server 104 via the communication unit 501. The file management unit 502 also sends events to the event information management server 104 via the communication unit 501. The file saving unit 503 saves the actual file received from the client device 101 in accordance with an instruction from the file management unit 502. The file saving unit 503 also sends actual files in response to requests from the constituent elements of the invention according to the embodiment illustrated in FIG. 1, in accordance with instructions from the file management unit 502. The following file management table (Table 1) shows an example of data managed by the file saving unit 503 for actual files.

TABLE 1

File Management Table

| ID | SAVE PATH | FILENAME | FILE SIZE | FILE DATA |
|---|---|---|---|---|
| 1 | logdata/client1 | 201601.log | 1024 KB | <binary data> |
| 2 | logdata/client1 | 201602.log | 2048 KB | <binary data> |
| 3 | logdata/client2 | 201605.log | 512 KB | <binary data> |

In Table 1, the "ID" column is a column that holds a value by which the file management application 500 uniquely identifies the files saved in the file server 102. The "save path" column is a column that holds path information of the storage location of the file in the file server 102. The "filename" column is a column that holds a value of the name of the file saved in the file server 102. The "file size" column is a column that holds a value of the size of file saved in the file server 102. The "file data" column is a column that holds binary data of the actual file saved in the file server 102.

File Information Management Server Software

Figure 6:
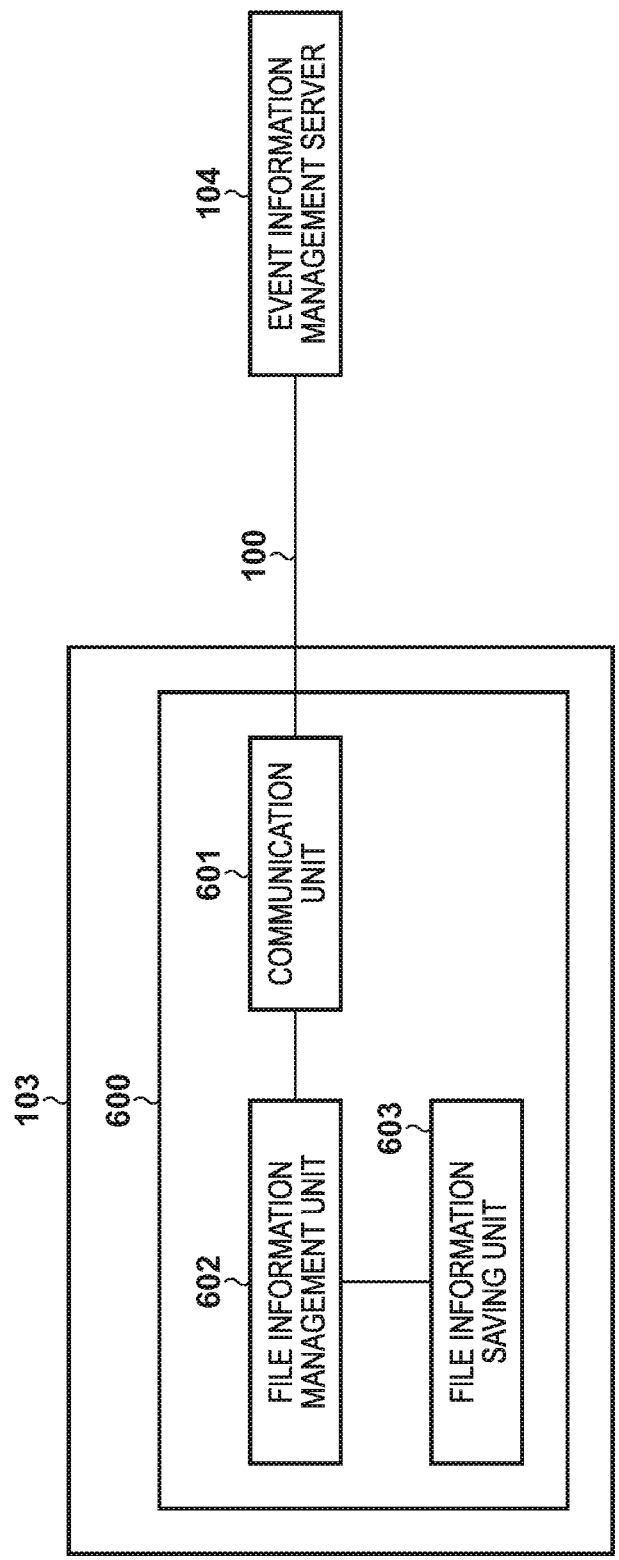
FIG. 6 is a diagram illustrating the software configuration of a file information server 103.

FIG. 6 is a block diagram illustrating an example of the software configuration of a file information management application 600 that runs on the file information management server 103 according to this embodiment. The file information management application 600 is stored in the storage device 303 of the file information management server 103 and executed by the CPU 301. The file information management application 600 is constituted of a communication unit 601, a file information management unit 602, and a file information saving unit 603. The communication unit 601 communicates with the event information management server 104 via the network device 304. The file information management unit 602 receives a request from the event information management server 104 via the communication unit 601. The file information saving unit 603 saves various types of attribute information extracted from the actual file received from the file server 102, in accordance with an instruction from the file information management unit 602. The attribute information is saved in the file information saving unit 603 as a result of the execution of asynchronous process code by the event information management server 104, which will be described later. The following file information management table (Table 2) shows an example of data managed by the file information saving unit 603 for the attribute information of files.

TABLE 2

File Information Management Table

| ID | FILE SERVER ID | ... | ATTRIBUTES |
|---|---|---|---|
| A | 1 | ... | <text data> |
| B | 2 | ... | <text data> |
| C | 3 | ... | <text data> |

In Table 2, the "ID" column is a column that holds a value by which the file information management application 600 uniquely identifies the file attribute information saved in the file information management server 103. The "file server ID" column is a column holding a value from the "ID" column of the file management table (Table 1) corresponding to the actual file from which the attribute information was extracted. The "attributes" column is a column that holds the attribute information extracted from the actual files. Various types of information can be given as examples of the specific values held in the "attributes" column, depending on the purpose of the application. For example, index text data for searching the full text extracted from a file can be given as an example. However, the values of the extracted attribute information are not particularly limited in this embodiment.

Event Information Management Server Software

Figure 7:
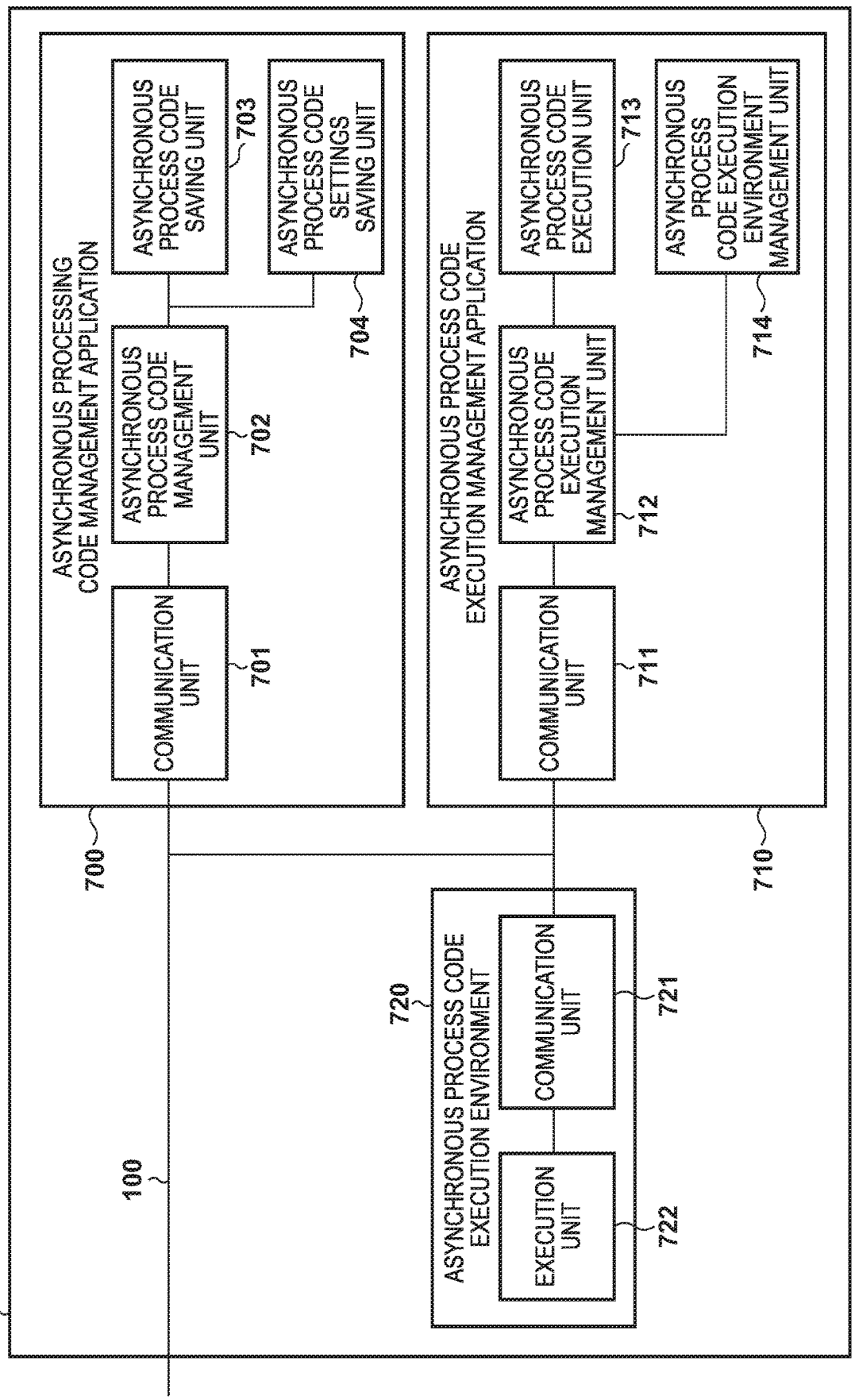
FIG. 7 is a diagram illustrating the software configuration of an event information management server 104.

FIG. 7 is a block diagram illustrating an example of the software configurations of respective applications that run on the event information management server 104 according to this embodiment. In the event information management server 104, an asynchronous process code management application 700, an asynchronous process code execution management application 710, and an asynchronous process code execution environment 720 are stored in the storage device 303 and executed by the CPU 301. The asynchronous process code management application 700 saves asynchronous process code executed by the event information management server 104 and manages execution settings of the asynchronous process code. The asynchronous process code management application 700 is constituted of a communication unit 701, an asynchronous process code management unit 702, an asynchronous process code saving unit 703, and an asynchronous process code settings saving unit 704. The communication unit 701 communicates with the administrator device 106 and the asynchronous process code execution management application 710 via the network device 304. The asynchronous process code management unit 702 receives an asynchronous process code registration request from the administrator device 106 via the communication unit 701. The asynchronous process code management unit 702 also receives an asynchronous process code request from the asynchronous process code execution management application 710. The asynchronous process code saving unit 703 saves the asynchronous process code received from the administrator device 106 in accordance with instructions from the asynchronous process code management unit 702. Additionally, the asynchronous process code saving unit 703 sends asynchronous process code to the asynchronous process code execution management application 710 in accordance with instructions from the asynchronous process code management unit 702. The following asynchronous process code management table (Table 3) shows an example of data for the asynchronous process code saving unit 703 to manage the asynchronous process code.

TABLE 3

Asynchronous Process Code Management Table

| ID | FILENAME | FILE DATA |
|---|---|---|
| 1 | asyncproc1.zip | <binary data> |
| 2 | asyncproc2.zip | <binary data> |

In Table 3, the "ID" column is a column that holds a value uniquely identifying the asynchronous process code saved by the asynchronous process code management application 700. The "filename" column is a column that holds a value of a filename of the asynchronous process code saved by the asynchronous process code management application 700. The "file data" column is a column that holds binary data of the asynchronous process code saved by the asynchronous process code management application 700.

The asynchronous process code settings saving unit 704 saves execution settings of the asynchronous process code received from the client device 101 in association with actual asynchronous process code in accordance with instructions from the asynchronous process code management unit 702. Additionally, the asynchronous process code settings saving unit 703 sends the execution settings of the asynchronous process code along with the asynchronous process code to the asynchronous process code execution management application 710 in accordance with instructions from the asynchronous process code management unit 702. The following execution environment settings table (Table 4) and event settings table (Table 5) show an example of data managed by the asynchronous process code settings saving unit 704 for the asynchronous process code execution settings.

TABLE 4

Execution Environment Settings Table

| ID | EXECUTION ENVIRONMENT TYPE | CPU | RAM | HDD |
|---|---|---|---|---|
| 1 | LOW | 1 GHz | 2 GB | 500 MB |
| 2 | NORMAL | 2 GHz | 4 GB | 1 GB |
| 3 | MIDDLE | 3 GHz | 6 GB | 5 GB |
| 4 | HIGH | 3 GHz | 8 GB | 10 GB |

In Table 4, the "ID" column is a column that holds a value by which the asynchronous process code management application 700 uniquely identifies the settings of a virtual machine environment for executing the asynchronous process code. The "execution environment type" column is a column that holds a name expressing the characteristics of the virtual machine environments for executing the asynchronous process code. The "CPU" column is a column that holds an index value of the CPU (a clock frequency or the like, for example) in the virtual machine environment for executing the asynchronous process code. The "RAM" column is a column that holds an index value of the RAM (bandwidth, capacity, or the like, for example) in the virtual machine environment for executing the asynchronous process code. The "HDD" column is a column that holds a size of the HDD in the virtual machine environment for executing the asynchronous process code.

TABLE 5

Event Settings Table

| ID | TARGET FILE PATH | TARGET EVENT | ASYNCHRONOUS PROCESS CODE ID | EXECUTION ENVIRONMENT ID |
|---|---|---|---|---|
| 1 | logdata/client1/ | add | 1 | 2 |
| 2 | | | 1 | 3 |
| 3 | | | 1 | 4 |
| 4 | logdata/client2/ | update | 2 | 3 |

In Table 5, the "ID" column is a column that holds a value by which the asynchronous process code management application 700 uniquely identifies an event for executing the asynchronous process code. The "target file path" column is a column that holds a target file path for executing the asynchronous process code. The "target event" column is a column that holds details of actions, executed on the file corresponding to the file path held in the "target file path" column, serving as conditions for executing the asynchronous process code. The "asynchronous process code ID" column is a column that holds the value of the "ID" column in the asynchronous process code management table corresponding to the asynchronous process code to be executed. The "execution environment ID" column is a column that holds a value of the "ID" column in the execution environment settings table corresponding to the environment for executing the asynchronous process code.

For example, when a record where the value in the "ID" column of the event settings table is 1, and a file has been "added" to a storage location below "logdata/client1", this indicates that, based on the asynchronous process code management table (Table 3), asynchronous process code in "asyncproc1.zip" having an asynchronous process code ID of 1 is to be executed in an environment that, based on the execution environment settings table (Table 4), has an execution environment ID of 1, or in other words, a virtual machine environment having a 2 GHz CPU, 4 GB of RAM, and a 1 GB HDD.

The asynchronous process code execution management application 710 obtains the asynchronous process code based on the event received from the file server 102, and the execution settings thereof, from the asynchronous process code management application 700, and creates the asynchronous process code execution environment 720 for executing that asynchronous process code. The asynchronous process code execution management application 710 is constituted of a communication unit 711, an asynchronous process code execution management unit 712, an asynchronous process code execution unit 713, and an asynchronous process code execution environment management unit 714. The communication unit 711 communicates with the file server 102, the asynchronous process code management application 700, and the asynchronous process code execution environment 720 via the network device 304. The asynchronous process code execution management unit 712 receives an event from the file server 102, and asynchronous process code and execution settings from the asynchronous process code management application 700, via the communication unit 711. The asynchronous process code execution unit 713 receives the asynchronous process code and execution settings from the asynchronous process code execution management unit 712. The asynchronous process code execution unit 713 generates the asynchronous process code execution environment 720 and instructs the execution of the asynchronous process code corresponding to the event on the basis of the execution settings received from the asynchronous process code execution management unit 712. The asynchronous process code execution environment management unit 714 manages the state of the execution of the asynchronous process code executed in the asynchronous process code execution environment 720. The following execution environment monitored item table (Table 6) shows an example of running conditions of the asynchronous process code execution environment 720, managed by the asynchronous process code execution environment management unit 714.

TABLE 6

Execution Environment Monitored Item Table

| ID | MONITORED ITEM | MONITORED ITEM VALUE |
|---|---|---|
| 1 | retry number | 5 |
| 2 | execution time | 60 |
| 3 | number of simultaneous asynchronous process code starts | 100 |

In Table 6, the "ID" column is a column that holds a value for uniquely identifying an item managing the running state of the asynchronous process code execution environment 720 in the asynchronous process code execution management application 710. The "monitored item" column is a column that holds an item for monitoring the state of execution of the asynchronous process code being executed by the asynchronous process code execution environment 720. The "monitored item value" column is a column that holds a threshold pertaining to the item held in the "monitored item" column. For example, a record in which the value in the "ID" column of the execution environment monitored item table (Table 6) is 1 means that up to five retries are allowed for the asynchronous process code executed by the asynchronous process code execution environment 720. In the case where the asynchronous process code cannot successfully complete the processing for the event even after five executions, an error occurs and the asynchronous process code execution management application 710 interrupts the execution of the asynchronous process code. Additionally, a record in which the value in the "ID" column of the execution environment monitored item table is 2 means that the time required by the asynchronous process code executed by the asynchronous process code execution environment 720 for processing the event is limited to 60 seconds. If no notification that the asynchronous process code has completed the processing is sent to the asynchronous process code execution management application 710 within 60 seconds, the asynchronous process code execution management application 710 sends an asynchronous process code termination instruction to the asynchronous process code execution environment 720 and interrupts the processing. A record in which the value in the "ID" column of the execution environment monitored item table is 3 means that the upper limit on the instances of asynchronous process code that can be executed simultaneously in the asynchronous process code execution environment 720 is 100. A start number counter that stores the asynchronous process code being run is incremented each time a single instance of asynchronous process code is started, and is decremented each time a single instance of asynchronous process code ends. Before attempting to generate the asynchronous process code execution environment 720, the above-described asynchronous process code execution unit 713 checks the start number counter, generating the asynchronous process code execution environment 720 if the counter has not yet reached 100 and ending without generating the asynchronous process code execution environment 720 if the counter has reached 100. Thus a variety of limitations for event-driven computing services can be defined in the execution environment monitored item table.

The asynchronous process code execution environment 720 is a virtual machine environment for executing asynchronous process code corresponding to an event sent to the asynchronous process code execution management application 710 by the file server 102, so as to process the event. The asynchronous process code execution environment 720 is provided as a cloud computing service. The hardware elements illustrated in FIG. 3 are implemented as application software by virtual machine software, and behave in the same manner as physical hardware elements. The asynchronous process code execution environment 720 is constituted of a communication unit 721 and an execution unit 722.

The communication unit 721 communicates with the file server 102, the file information management server 103, and the asynchronous process code execution management application 710 via the network device 304. The execution unit 722 executes the asynchronous process code received from the asynchronous process code execution management application 710 via the communication unit 721, and processes the event received from the asynchronous process code execution management application 710. Additionally, the execution unit 722 receives a monitoring request for the asynchronous process code being executed from the asynchronous process code execution management application 710, and controls the execution of the asynchronous process code.

File Storage Location Management Server Software

FIG. 8 is a block diagram illustrating an example of the software configuration of a file storage location management application 800 that runs on the file storage location management server 105 according to this embodiment. The file storage location management application 800 is stored in the storage device 303 of the file storage location management server 105 and executed by the CPU 301. The file storage location management application 800 is constituted of a communication unit 801 and a file storage location setting unit 802. The communication unit 801 communicates with the client device 101 via the network device 304. The file storage location setting unit 802 receives a request from the client device 101 via the communication unit 801. In response to the request, the file storage location setting unit 802 obtains an identifier of the client device that sent the request, a type of file, a filename, and the like, and sets a storage location. The file storage location management table (Table 7) shows an example of a table through which the file storage location setting unit 802 sets the storage location.

TABLE 7

File Storage Location Management Table

| ID | CONDITIONS | SAVE PATH |
|---|---|---|
| 1 | client identifier: client1<br>file type: log information<br>filename: any | logdata/client1 |
| 2 | client identifier: client2<br>file type: log information<br>filename: any | logdata/client2 |

In Table 7, the "ID" column is a column that holds a value for uniquely identifying items for managing file storage location setting conditions in the file storage location management application 800. The "conditions" column is a column that holds a condition or a group of conditions for setting the storage location. The "save path" column is a column that holds information indicating the storage location.

Administrator Device Software

FIG. 9 is a block diagram illustrating an example of the software configuration of a management application 900 that runs on the administrator device 106 according to this embodiment. The management application 900 is stored in the storage device 203 of the administrator device 106 and executed by the CPU 201. The management application 900 is constituted of a communication unit 901 and a management unit 902. The communication unit 901 communicates with the event information management server 104 via the network device 204. The management unit 902 generates and manages asynchronous process code, and sends asynchronous process code registration requests to the event information management server 104 via the communication unit 901.

Registration of Asynchronous Process Code

FIG. 10 is a sequence chart illustrating a series of processes through which the administrator device 106 registers asynchronous process code in the asynchronous process code management application 700 of the event information management server 104.

In step S1001, the administrator device 106 sends the asynchronous process code registration request to the asynchronous process code management application 700 via the communication unit 901. The following asynchronous process code registration request record (Table 8) shows an example of a record sent to the asynchronous process code management application 700 as the asynchronous process code registration request.

TABLE 8

Asynchronous Process Code Registration Request Record

| ASYN-CHRONOUS PROCESS CODE | ASYN-CHRONOUS PROCESS CODE FILENAME | EXECU-TION TARGET FILE PATH | EXECU-TION TARGET EVENT | EXECU-TION ENVI-RONMENT ID |
|---|---|---|---|---|
| <binary data> | asyncproc1.zip | logdata/client1 | add | 2 |

The "asynchronous process code" column is a column that holds the actual asynchronous process code as binary data. The "asynchronous process code filename" column is a column that holds the filename of the asynchronous process code. The "execution target file path" column is a column that holds a file path in the file server 102 for executing the asynchronous process code. The asynchronous process code execution management application 710 refers to the file path included in the event received from the file server 102, and in the case where that path matches the path held in this column, determines that the event is an event for which the asynchronous process code is to be executed. The "execution target event" column is a column that holds an action for which the asynchronous process code is to be executed for the file held in the execution target file path in the file server 102. The "execution environment ID" column is a column that holds a value of the "ID" column in the execution environment settings table corresponding to the environment for executing the asynchronous process code. For example, the asynchronous process code registration request record indicated in Table 8 corresponds to a request for, in the case where a file has been added to a storage location below logdata/client1 in the file server 102, registering an asynchronous process code file asyncproc1.zip to be executed in an execution environment indicated by an ID of 2.

In step S1002, the asynchronous process code execution management application 710 generates an asynchronous process code management record from the asynchronous process code registration request record received by the communication unit 701, and stores the record in the asynchronous process code management table (Table 3) in the asynchronous process code saving unit 703. The value of the "asynchronous process code filename" column in the asynchronous process code registration request record is held in the "filename" column of the asynchronous process code management record. The binary data in the "asynchronous process code" column of the asynchronous process code registration request record is held in the "file data" column of the asynchronous process code management record.

In step S1003, the asynchronous process code execution management application 710 generates an event settings record and stores that record in the event settings table (Table 5) in the asynchronous process code settings saving unit 704. The value of the "execution target file path" column of the asynchronous process code registration request record is held in the "target file path" column of the event settings record. The value of the "execution target event" column of the asynchronous process code registration request record is held in the "target event" column of the event settings record. The value in the "ID" column of the asynchronous process code management record, held in the asynchronous process code management table of the asynchronous process code saving unit 703 in step S1002, is held in the "asynchronous process code ID" column of the event settings record. The value of the "execution environment ID" column of the asynchronous process code registration request record is held in the "execution environment ID" column of the event settings record. The asynchronous process code is registered in the asynchronous process code execution management application 710 as a result of this series of processes.

Execution of Asynchronous Process Code

The flow of a sequence through which the asynchronous process code in the event information management server 104 illustrated in FIG. 7 executes processing in response to an event occurring in the file server 102 will be described next.

Figure 11A:
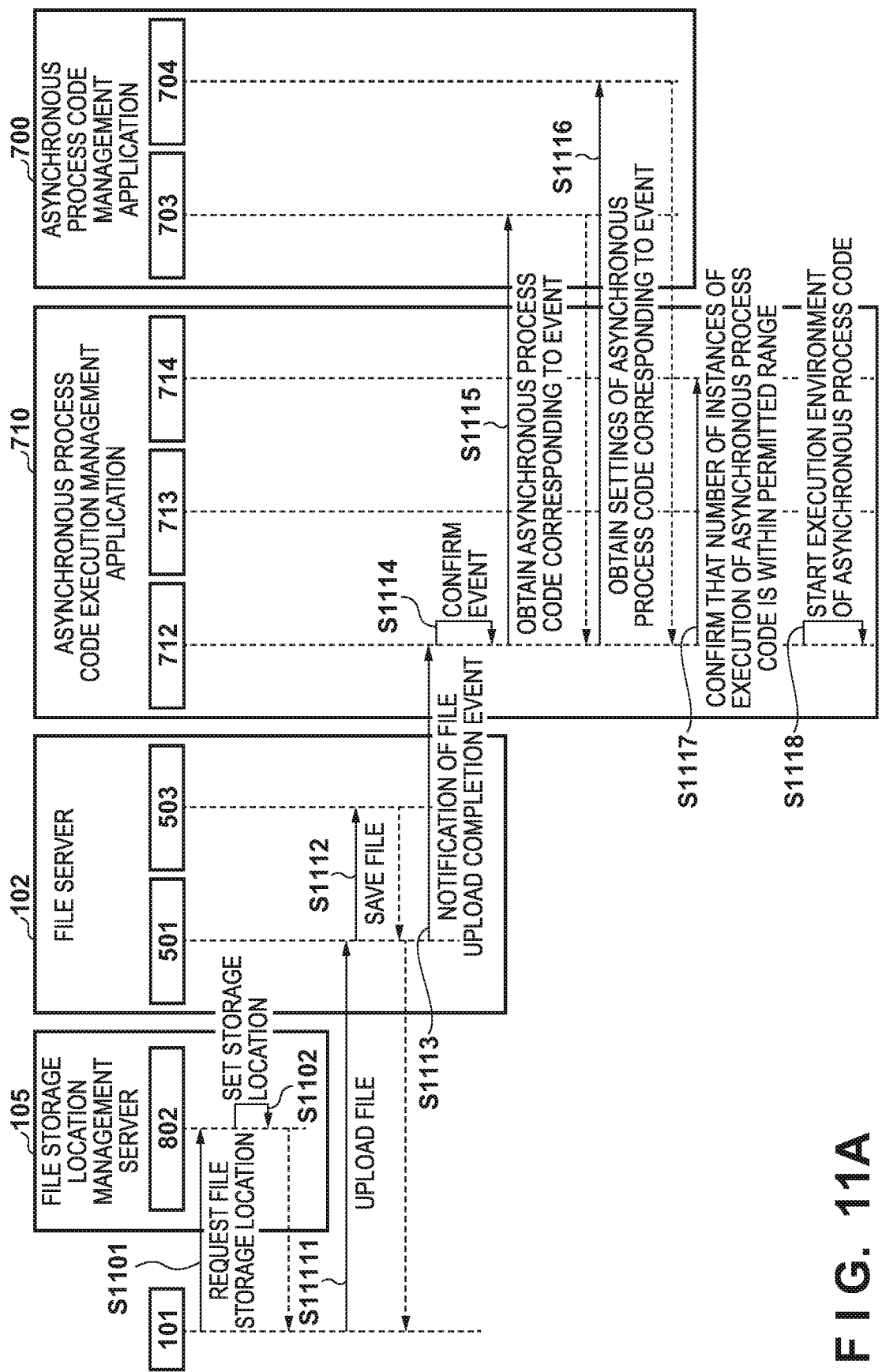
FIGS. 11A and 11B are sequence charts illustrating a series of processes executed by the asynchronous process code.
Figure 11B:
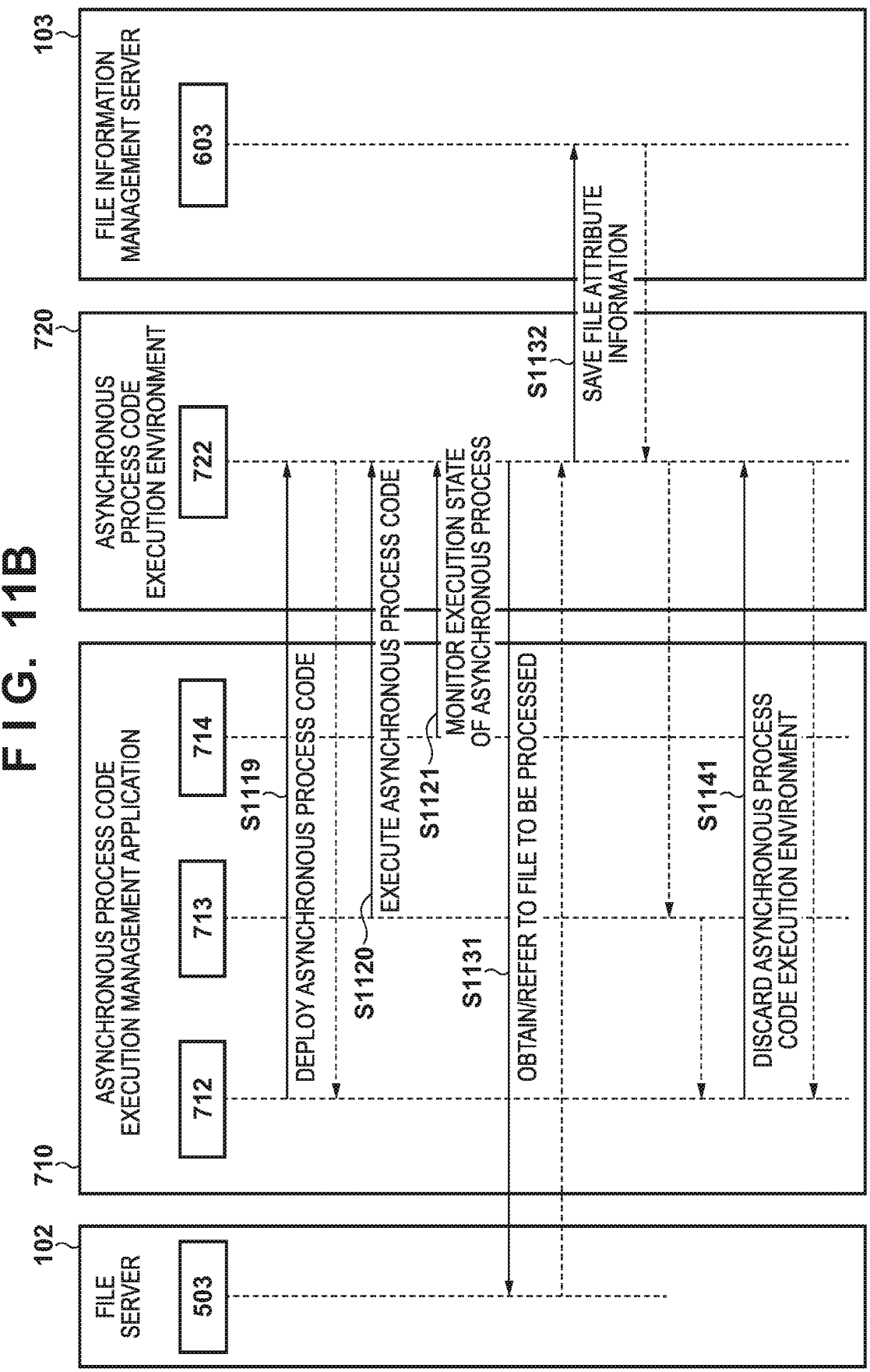

FIGS. 11A and 11B are sequence charts illustrating a series of processes in which the asynchronous process code is started and completed, according to this embodiment. Together, FIGS. 11A and 11B illustrate a single sequence. The asynchronous process code illustrated in FIGS. 11A and 11B takes an operation of the client device 101 newly registering a file in the file server 102 as an event and starts automatically in response to that event, and carries out processing for extracting attribute information of the newly-registered file and registering the information in the file information saving unit 603 of the file information management server 103. Of course, these are only examples of the event and the event-driven computing service, and another event may be used as the trigger, and another process as the service, instead.

In step S1101, the client device 101 sends a file storage location request to the file storage location management server 105 via the communication unit 401. In step S1102, the file storage location setting unit 802 sets a save destination path on the basis of the received request and returns the save destination path to the client device 101. Here, it is assumed that the save destination path is set to the save path "logdata/client1" in the file storage location management table record (Table 7) having an ID of 1.

In step S1111, the client device 101 sends, to the file server 102, a file upload request for registering log information output by the information collecting unit 402 as a file via the communication unit 401. The following file upload request record shows an example of the record sent to the file server 102 as the file upload request.

TABLE 9

File Upload Request

| FILE DATA | FILENAME | SAVE DESTINATION PATH |
|---|---|---|
| <binary data> | 201601.log | logdata/client1 |
| <binary data> | 201602.log | logdata/client1 |
| <binary data> | 201603.log | logdata/client1 |

In Table 9, the "file data" column is a column that holds binary data of the file to be sent. The "filename" column is a column that holds the name of the file to be sent. The "save destination path" column is a column that holds the storage location in the file server 102 where the file is uploaded. The save destination path is provided as a response to the request from step S1101.

In step S1112, the file server 102 adds the data included in the file upload request received by the communication unit 501 to the file management table (Table 1) of the file saving unit 503. Once the file server 102 has finished adding the data to the file saving unit 503, the file server 102 sends a response to the client device 101 via the communication unit 501, indicating that the file upload is complete.

In step S1113, the file server 102 generates an event indicating that the file upload is complete, and notifies the asynchronous process code execution management application 710 of the event via the communication unit 501. The following file upload completion event shows an example of a record sent to the asynchronous process code execution management application 710 as the file upload completion event.

TABLE 10

File Upload Completion Event

| FILE PATH | EVENT TYPE |
| --- | --- |
| logdata/client1/201601.log | add |

In Table 10, the "file path" column is a column that holds the file path, in the file server 102, of the file serving as the trigger for generating the event. The "event type" column is a column that holds the details of an operation carried out on the file, in the file server 102, saved in the file path held in the "file path" column. In step S1111, a file was newly uploaded from the client device 101 to the file server 102, and thus a value of "add" is entered here.

In step S1114, the asynchronous process code execution management application 710 uses the asynchronous process code execution management unit 712 to confirm the details of the file upload completion event received via the communication unit 711. First, the asynchronous process code execution management unit 712 obtains the path name, excluding the filename, from the value in the "file path" column of the file upload completion event, along with the value in the "event type" column. Next, via the communication unit 711, the asynchronous process code execution management unit 712 refers to the event settings table (Table 5) in the asynchronous process code settings saving unit 704 of the asynchronous process code management application 700, searches out a record in which the combination of the value in the "target file path" column and the value in the "target event" column matches the combination of the path name and the value in the "event type" column, and if such a record is present, obtains the record. If no such record is present, it can be determined that no asynchronous processing that takes the notified event as a trigger is set. In this case, the sequence may be terminated at step S1114.

However, if such a record is present, in step S1115, the asynchronous process code execution management unit 712 obtains, from the asynchronous process code management application 700, the asynchronous process code corresponding to the event confirms in step S1114. The asynchronous process code execution management unit 712 searches out a record matching the value in the "asynchronous process code ID" column of the event settings record from the asynchronous process code management table (Table 3) of the asynchronous process code saving unit 703, and obtains the binary data of the asynchronous process code held in the "file data" column.

In step S1116, the asynchronous process code execution management unit 712 obtains, from the asynchronous process code management application 700, the settings for executing the asynchronous process code obtained in step S1115. The asynchronous process code execution management unit 712 searches out a record matching the value of the "execution environment ID" column in the event settings record from the execution environment settings table (Table 4) in the asynchronous process code saving unit 703, and obtains the record.

In step S1117, the asynchronous process code execution management unit 712 confirms with the asynchronous process code execution environment management unit 714 whether or not the number of instances of asynchronous process code being executed is within the permitted range. FIG. 16 illustrates the flow of this process. In step S1601, it is confirmed whether the number of instances of asynchronous process code being executed is lower than a maximum permitted number (an upper limit value indicated by the ID of 3 in Table 6). In the case of a determination of "yes" (that is, that the upper limit value has not been reached), the process advances to step S1602, where the start number counter is incremented, or in other words, 1 is added to the start number counter. A new asynchronous process code is permitted to be executed in this case. On the other hand, in the case of a determination of "no" in step S1601 (that is, that the upper limit value has been reached), the process advances to step S1603, and the execution of a new instance of asynchronous process code is not permitted. Alternatively, the processing for the current event is interrupted. This completes the descriptions of FIG. 16. Note that the processing illustrated in FIG. 16 may be carried out by the asynchronous process code execution management unit 712 that has obtained the number of instances of asynchronous process code being executed from the asynchronous process code execution environment management unit 714, or may be carried out by the asynchronous process code execution environment management unit 714 and the result thereof may be returned to the asynchronous process code execution management unit 712. Note also that in the case where the execution of asynchronous process code has ended, 1 is subtracted from the start number counter. This subtraction process may be carried out by the asynchronous process code execution management unit 712, for example. In the case where the execution of a new instance of asynchronous process code is not permitted, the processing sequence may be ended at that time, or step S1117 may be repeated to retry for a set amount of time or a set number of times. If the code cannot be executed through retries for a set amount of time or a set number of times, the processing sequence may be ended at that time.

In the case where the execution of new asynchronous process code is permitted, in step S1118, the asynchronous process code execution management unit 712 creates and starts the virtual machine of the asynchronous process code execution environment 720 having the specifications based on the execution environment settings record obtained in step S1116.

In step S1119, the asynchronous process code execution management unit 712 deploys the asynchronous process code obtained in step S1115 to the storage device 303 of the asynchronous process code execution environment 720 via the communication unit 711.

In step S1120, the asynchronous process code execution unit 713 sends an asynchronous process code execution request to the execution unit 722 of the asynchronous process code execution environment 720 via the communication unit 711. Upon receiving the asynchronous process code execution request, the execution unit 722 loads the asynchronous process code received in step S1119 into the RAM 302 and starts the execution of the asynchronous process code. The following asynchronous process code execution request record shows an example of the record sent to the execution unit 722 as the asynchronous process code execution request.

TABLE 11

Asynchronous Process Code Execution Request Record

| FILE PATH | EVENT SETTINGS ID |
|---|---|
| logdata/client1/201601.log | 1 |
| logdata/client1/201602.log | 1 |
| logdata/client1/201603.log | 1 |

In Table 11, the "file path" column is a column that holds a path in the file server 102 of the file to be processed with the asynchronous process code. The value of the "file path" column in the file upload completion event record received in step S1113 is held here. The "event settings ID" column is a column that holds the value in the "ID" column of the event settings record (Table 5) obtained in step S1113 by the asynchronous process code execution management application 710.

The execution unit 722 manages the state of the execution of the asynchronous process code being executed. The following execution state record shows an example of an execution state record managed by the execution unit 722.

TABLE 12

Execution State Record

| ID | STATUS | EXECUTION NUMBER | ELAPSED TIME |
|---|---|---|---|
| 1 | executing | 1 | 40 |
| 2 | executing | 1 | 45 |
| 3 | executing | 1 | 50 |

In Table 12, the "ID" column is a column that holds a value uniquely identifying the asynchronous process code being executed by the execution unit 722. The "status" column is a column that holds the value of an execution status of each instance of asynchronous process code being executed by the execution unit 722. It is conceivable that the number of values possible as the status will increase/decrease depending on the details of the processing implemented by the asynchronous process code. In this embodiment, the value is "executing" during the time from when the asynchronous process code is started to when the asynchronous process code ends. If the processing has ended normally, the value is "OK", whereas if the processing has ended with an error, the value is "error". The "execution number" column is a column that holds the number of times the execution unit 722 has executed the asynchronous process code for the event that has occurred in the file server 102. The number of times the code has been executed refers, for example, to a number of retries. The "elapsed time" column is a column that holds the amount of time elapsed from when the execution unit 722 started the execution of the asynchronous process code, in seconds, for example. The value in the "elapsed time" column is incremented while the value in the "status" column is "executing", and the incrementing is stopped when the value in the "status" column has become "OK" or "error". The value in the "elapsed time" column is reset to 0 when the value in the "status" column changes one again to "executing".

Figure 12:
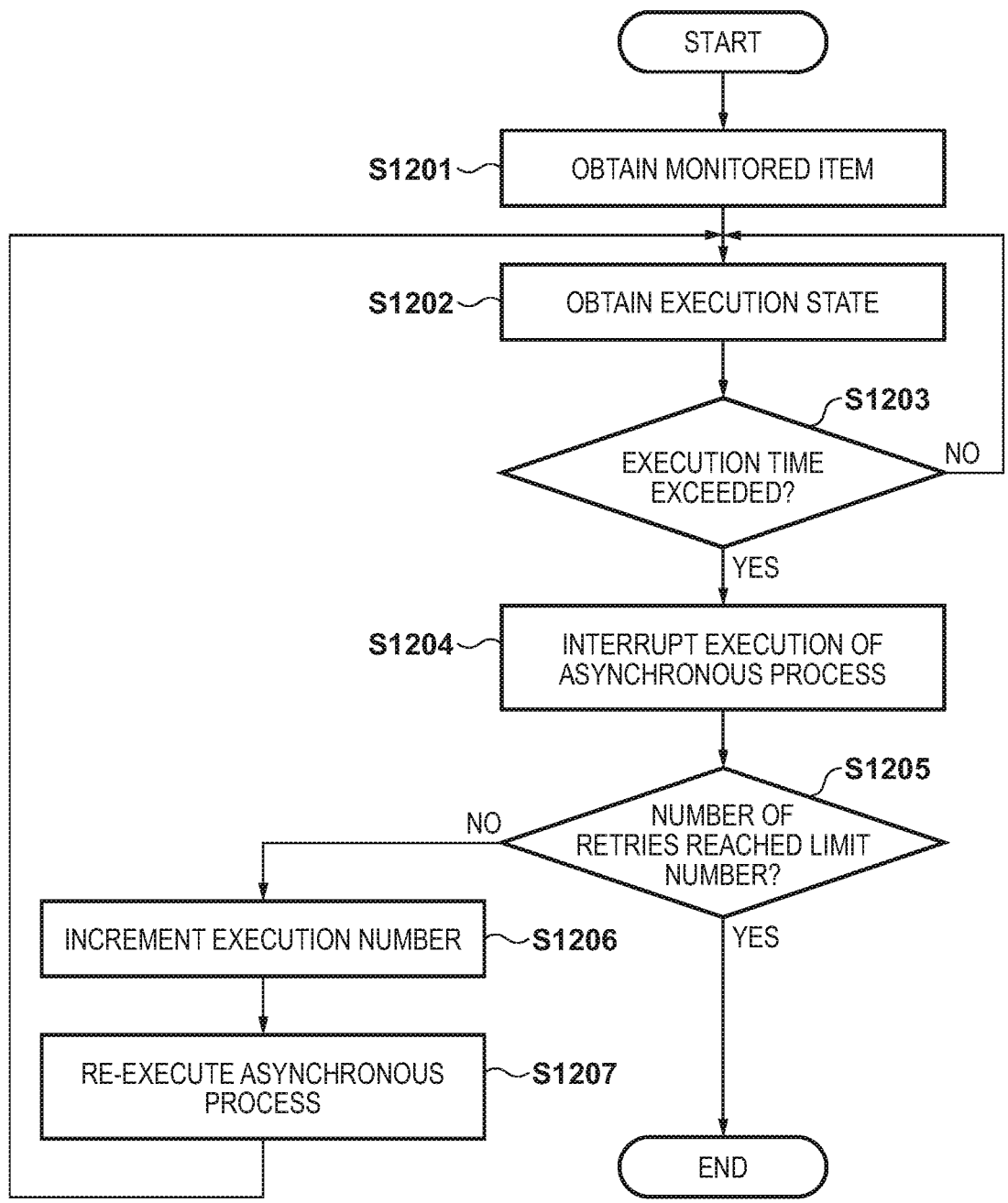
FIG. 12 is a flowchart illustrating an asynchronous process code monitoring process.

In step S1121, the asynchronous process code execution environment management unit 714 executes a monitoring process that confirms the execution state of the asynchronous process started in step S1120. FIG. 12 is a flowchart illustrating the monitoring process executed by the asynchronous process code execution environment management unit 714 in step S1121 in detail. This process is executed in parallel with the asynchronous process started in step S1120, and is executed by the asynchronous process code execution environment management unit 714 until the asynchronous process ends or until the monitored item registered in the execution environment monitored item table (Table 6) of the asynchronous process code execution environment management unit 714 is exceeded.

In step S1201, the asynchronous process code execution environment management unit 714 obtains the execution environment monitored item records from the execution environment monitored item table.

In step S1202, the asynchronous process code execution environment management unit 714 obtains the execution state record of the asynchronous process code execution environment 720.

In step S1203, the asynchronous process code execution environment management unit 714 compares the value in the "elapsed time" column of the execution state record obtained in step S1002 with the value of the "monitored item value" column in the record in which the value in the "monitored item" column of the execution environment monitored item record obtained in step S1201 is "execution time". In the case where the value in the "elapsed time" column is less than the value in the "monitored item value" column, the process returns to step S1202 and the monitoring is continued. In the case where the value in the "elapsed time" column is greater than the value in the "monitored item value" column, the process advances to step S1204.

In step S1204, the asynchronous process code execution environment management unit 714 interrupts the process executed by the asynchronous process code execution environment 720.

In step S1205, the asynchronous process code execution environment management unit 714 compares the value in the "execution number" column of the execution state record obtained in step S1202 with the value of the "monitored item value" column in the record in which the value in the "monitored item" column of the execution environment monitored item record obtained in step S1201 is "retry number". In the case where the value in the "execution number" column is less than the value in the "monitored item value" column, the process advances to step S1206. In the case where the value in the "execution number" column matches the value in the "monitored item value" column, the monitoring process ends.

In step S1206, the asynchronous process code execution environment management unit 714 adds 1 to the value in the "execution number" column of the execution state record of the asynchronous process code execution environment 720.

In step S1207, the asynchronous process code execution environment management unit 714 re-executes the asynchronous process code.

Through this series of processes, the asynchronous process code in the asynchronous process code execution environment 720 is monitored so as to be executed without exceeding a limit value set by the asynchronous process code execution management application 710. In the case where it is determined in step S1205 that the retry number has reached the limit value, the processing sequence is ended at that time without any further retries. If, rather than in this step, the sequence illustrated in FIGS. 11A and 11B is ended without the asynchronous process code being executed or with the asynchronous process code being interrupted, that information may be recorded in the execution log. Note also that although steps S1131 and S1132 are denoted as being executed after step S1121 in FIG. 11B, this is simply to make the drawing easier to understand. Step S1131 and step S1132 are steps carried out by executing the asynchronous process code, and implement processing based on the details of the asynchronous process code. The monitoring carried out in step S1121 is repeated, periodically for example, during the execution of the asynchronous process code.

In step S1131, the execution unit 722 obtains, from the file server 102, the file corresponding to the file path in the asynchronous process code execution request record received in step S1120.

In step S1132, the execution unit 722 extracts the attribute information from the file obtained in step S1131, generates a file attribute information record, and registers the record in the file information management table in the file information saving unit 603 of the file server 102. When the asynchronous process code ends normally, the execution unit 722 sends a notification of the code ending to the asynchronous process code execution management unit 712.

When the execution of the asynchronous process code ends, in step S1141, the asynchronous process code execution management unit 712 shuts down and discards the virtual machine of the asynchronous process code execution environment 720. Meanwhile, the asynchronous process code execution environment management unit 714 decrements the number of monitored instances of asynchronous process code running (managed as the ID of 3 in Table 6) by one. Whether the execution of the asynchronous process code has ended can be determined by, for example, monitoring the execution state in step S1121. Alternatively, the execution unit 722 may notify the asynchronous process code execution unit 713 that the processing has ended.

Avoiding Failures Caused by Limitations on Asynchronous Process Code

Each time an event arises in the file server 102 due to the series of processes illustrated in FIGS. 10, 11A, 11B, 12, and 16, the asynchronous process code corresponding to the event is executed as appropriate in the event information management server 104. However, as described above, there is a limit on the number of instances of asynchronous process code that can be executed simultaneously, and thus there are cases where all of the processes cannot be run. For example, although the client device information transmission application 400 sends the log information to the client device 101 as a file, there are cases where a plurality of files are held in accordance with a holding period, the amount of information, and so on, and those files are then sent together. In the case where the number of files is extremely high or the sending occurs concurrently with other files being sent from the client device 101, a large number of file receiving events will occur in a short amount of time. As a result, there are cases where the number of instances of asynchronous process code started reaches the permitted limit and further event processing cannot be carried out. A method that solves this problem by suppressing the execution of asynchronous process code will be described next. In this embodiment, it is assumed that in addition to a plurality of log files, the client device information transmission application 400 sends a statistics information file (stat.txt) denoting a total number of pieces of information in the series of log files that have been sent. By receiving the statistics information file, the recipient can determine whether the entire series of log files has arrived. Hereinafter, in this embodiment, it is assumed that the processing is carried out using the following settings, conditions, and so on.

TABLE 13

File Storage Location Management Table

| ID | CONDITIONS | SAVE PATH |
|---|---|---|
| 1 | client identifier: client1<br>file type: log information<br>filename: *.log | logdata/client1 |
| 2 | client identifier: client1<br>file type: log information<br>filename: stat.txt | logdata/client1-NUM |

The file storage location management server 105 returns the save path having an ID of 1 when the client device 101 (client1) sends the log file (*.log), and returns the save path having an ID of 2 when the client device 101 sends the statistics information file (stat.txt). Additionally, it is assumed that the content of an asynchronous process code management table is as shown in Table 14.

TABLE 14

Asynchronous Process Code Management Table

| ID | FILENAME | FILE DATA |
|---|---|---|
| 1 | FuncA.zip | <binary data> |

That is, asynchronous process code called "FuncA" is registered with an ID of 1. The flow of processing of FuncA will be described later with reference to FIG. 15. The content of the event settings table is as shown in Table 15.

TABLE 15

Event Settings Table

| ID | TARGET FILE PATH | TARGET EVENT | ASYNCHRONOUS PROCESS CODE ID | EXECUTION ENVIRONMENT ID |
|---|---|---|---|---|
| 1 | logdata/client1-NUM | add | 1 | 1 |

That is, the settings are such that an event occurs when a file is "added" to the file path "logdata/client1-NUM", and asynchronous process code having an asynchronous process code ID of 1 is executed in an execution environment having an ID of 1. In other words, this means that the asynchronous process code of "FuncA" is executed only in the case where the file server 102 has received "stat.txt".

Execution of Asynchronous Process Code in the Embodiment

Figure 13A:
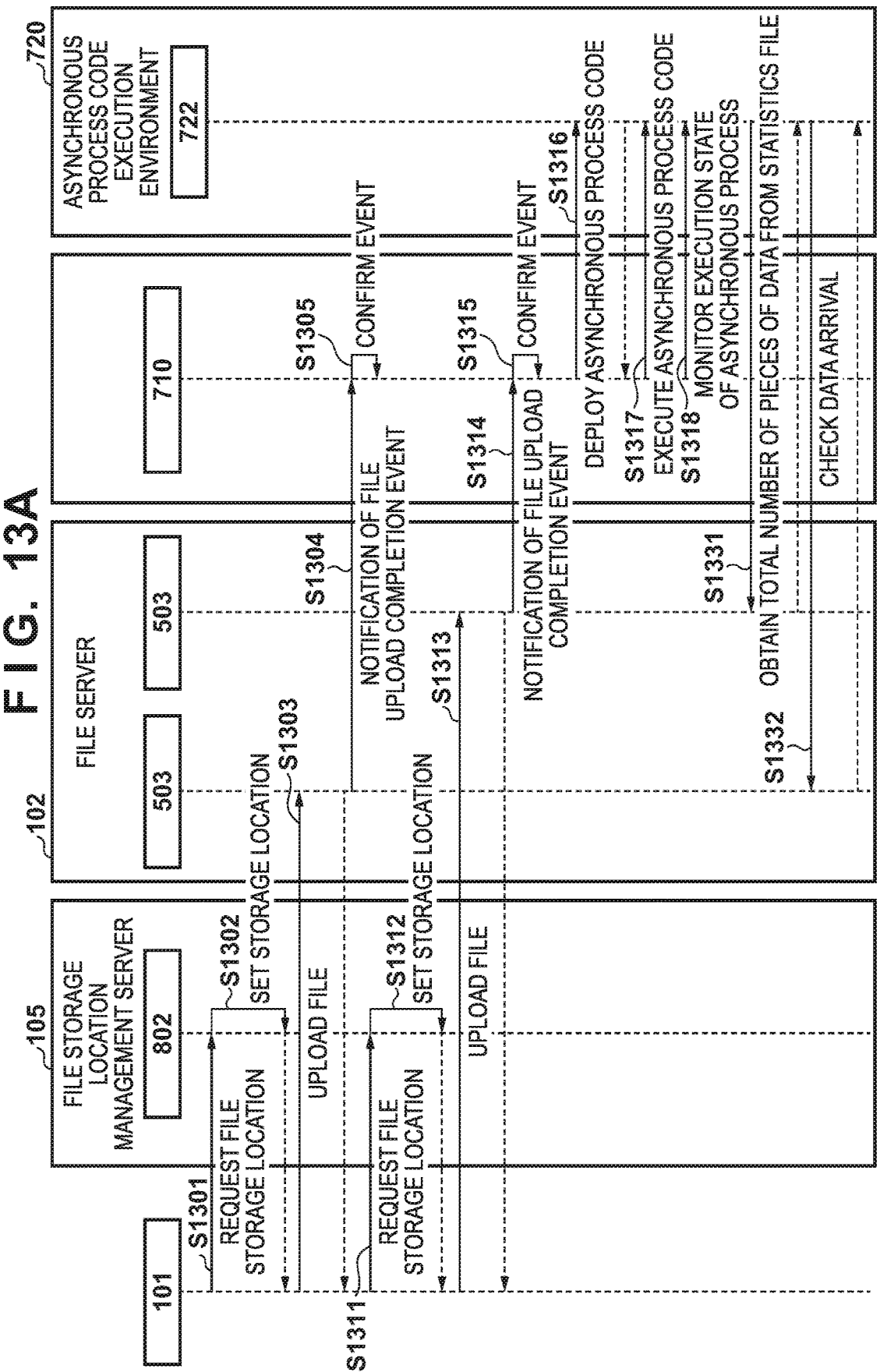

Processing will be described hereinafter using FIGS. 13A and 13B. In step S1301, the client device 101 inquires with the file storage location management server 105 as to the storage location of a log file (this is the same as step S1101).

In step S1302, the file storage location management server 105 sets the storage location (this is the same as step S1102). Step S1302 will be described in detail here using FIG. 14. In step S1401, it is determined whether or not the target of the request is the statistics information file (filename: stat.txt). The process advances to step S1402 in the case of a determination of "yes" in step S1401, and advances to step S1403 in the case of a determination of "no". In step S1402, statistics information storage (logdata/client1-NUM) is set as the storage location. In step S1403, log file storage (logdata/client1) is set as the storage location. In step S1404, the storage location is returned. It is assumed that in step S1302, the file is a log file, and thus the log file storage (logdata/client1) is returned.

In step S1303, the client device 101 uploads the file to the file server 102 (this is the same as step S1111). Because the file is a log file this time, the save path is the log file storage.

In step S1304, the file server 102 sends event information to the event information management server 104 (this is the same as step S1113). Table 16 is an example of the event information issued in step S1304.

TABLE 16

| File Upload Completion Event | |
|---|---|
| FILE PATH | EVENT TYPE |
| logdata/client1/201601.log | add |

In step S1305, the asynchronous process code execution management application 710 confirms the event details (this is the same as step S1114). Here, no record corresponding to the event shown in Table 16 is present in the event settings table shown in Table 15, and thus no asynchronous process code is executed. Thereafter, when a log file is sent from the client device 101, the processing from step S1301 to step S1305 is repeated.

Next, assume that the statistics information file has been sent from the client device 101. Although it is assumed that the statistics information file is the last file sent after all of the log files have been sent, there are also cases where the statistics information file arrives at the file server 102 earlier due to the sizes of the files, traffic, and so on. As such, an example that takes into consideration a case where the statistics information file is processed before all of the log files are present will be described here.

In step S1311, a request for the file storage location is issued in the same manner as in step S1301.

Figure 14:
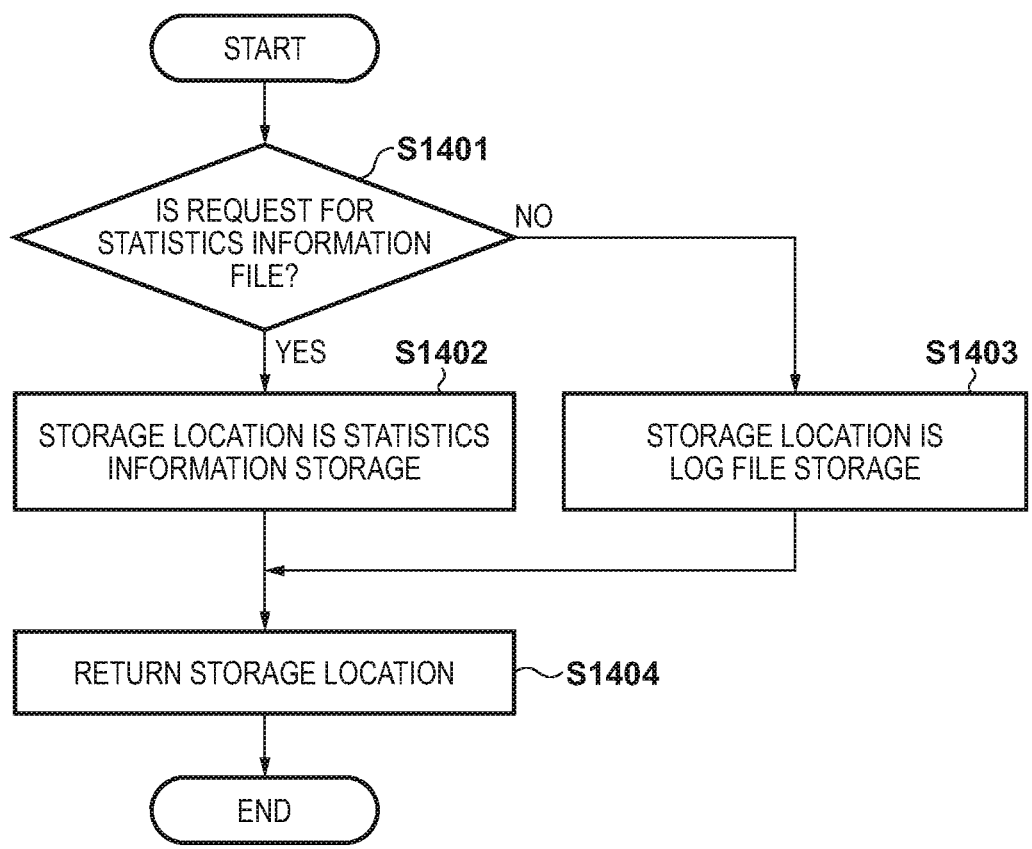
FIG. 14 is a flowchart of a file storage location management application 800.

In step S1312, the file is the statistics information file, and thus the statistics information storage (logdata/client1-NUM) is returned to the processing illustrated in FIG. 14.

From step S1313 to step S1314, the event information is sent, in the same manner as in step S1303 and step S1304. Table 17 is an example of the event information issued in step S1314.

TABLE 17

| File Upload Completion Event | |
|---|---|
| FILE PATH | EVENT TYPE |
| logdata/client1-NUM/stat.txt | add |

In step S1315, the asynchronous process code execution management application 710 confirms the event details (this is the same as step S1305). Here, a record corresponding to the event shown in Table 17 is present in the event settings table shown in Table 15, and thus asynchronous process code is executed.

The processes of step S1315 to step S1318 are the same as the processes of step S1114 to step S1121. Although not indicated here, steps S1115, S1116, S1117, and S1118 are also executed. In other words, it is determined whether or not the number of instances of asynchronous process code executed is within the permitted range, and the asynchronous process code is executed in the case where the number is determined to be within the permitted range.

From step S1331 to step S1334, the registered asynchronous process code is executed by the execution unit 722. The flow of this processing will be described in detail using FIG. 15.

Upon the asynchronous process code being executed, in step S1502, a request for obtaining the statistics information file is made to the file server 102, and the total number of log files is read out from the obtained information (step S1331 also indicates this process).

In step S1504, an inquiry is made to the file server 102 regarding the number of log files that have arrived (step S1332 also indicates this process). Here, only the series of log files sent by the client device 101 this time are confirmed. For example, a method of further adding a date path partway along the save path to ensure that only a series of log files is added to that storage location, a method of adding attribute information to the files and confirming the attribute information, a method of providing stat.txt with a filename, and so on can be considered, but the method is not limited thereto.

When it is determined in step S1505 that all of the files are present, the process advances to step S1506, whereas when it is determined that all the files are not present, the process advances to step S1508.

Upon advancing to step S1508, the process waits (stands by) for a set amount of time, returns to step S1504, and repeats the check.

However, upon advancing to step S1506, a request to obtain a file is made to the file server 102 (step S1334 also indicates this process; this is the same as step S1131). Here, the information of all the files pertaining to the series of log information is obtained.

Meanwhile, in step S1507, a request to save the attribute information is made to the file information management server 103 (step S1335 also indicates this process; this is the same as step S1132). Likewise, the attribute information for all of the files pertaining to the series of log files collected on the basis of the statistics information file is saved at once. After this, the process of FIG. 15 ends. Here, there is only a single instance of asynchronous process code for saving the attribute information, regardless of the number of log files uploaded.

Returning to FIG. 13A, in the check carried out in step S1332, all of the log files are not yet present, and thus a determination of "no" is made in step S1505. Assume that the final log file then arrives from the client device 101, and the processing from step S1321 to step S1325 has been carried out. As a result, the next time the check is made in step S1333, a determination of "yes" is made in step S1505.

Thereafter, in step S1341, the asynchronous process code execution environment is discarded (this is the same as step S1141).

As described thus far, according to this embodiment, even if a first type of event in response to which event-driven processing is normally to be carried out, for example a file such as a log file being uploaded, is detected, the processing is not carried out. When a second type of event, such as statistics information of log files being uploaded, is then detected, event-driven processing is carried out in response thereto. In the processing, information such as attributes is saved for the log file that is normally to be processed, which is information aside from the data of the statistics information pertaining to the event, that is, the statistics information being uploaded.

Accordingly, even in an environment in which many events can arise due to multiple files being stored, the events can be processed all at once using a single representative instance of asynchronous process code, and the execution of asynchronous process code for other events can be suppressed. As a result, the risk of events not being handled can be reduced.

Second Embodiment

The first embodiment describes an example in which the file storage location management server 105 is used to set different storage locations for log files and the statistics information file, and event processing is carried out only for the statistics information file. However, there are cases where the client device information transmission application 400 has a predetermined storage location, and cases where the same storage location is specified even if an inquiry is made to the file storage location management server 105. Accordingly, this embodiment will describe a processing method that suppresses concurrent execution of asynchronous process code to the greatest extent possible even in cases where file storage locations are the same. Hereinafter, in this embodiment, it is assumed that the processing is carried out using the following settings, conditions, and so on. Table 18 shows an example of the file storage location management table according to this embodiment.

TABLE 18

File Storage Location Management Table

| ID | CONDITIONS | SAVE PATH |
|---|---|---|
| 1 | client identifier: client1<br>file type: log information<br>filename: (no restrictions) | logdata/client1 |

As indicated by Table 18, this embodiment describes an example in which all of the files sent from the client device 101 are stored in "logdata/client1". Rather than inquiring with the file storage location management server 105, the client device information transmission application 400 may itself hold the save path. Table 19 shows an example of the asynchronous process code management table according to this embodiment.

TABLE 19

Asynchronous Process Code Management Table

| ID | FILENAME | FILE DATA |
|---|---|---|
| 1 | FuncB.zip | <binary data> |

According to Table 19, asynchronous process code "FuncB" is registered for the ID of 1. The flow of processing of FuncB will be described later with reference to FIG. 18. Table 20 shows an example of the event settings table according to this embodiment.

TABLE 20

Event Settings Table

| ID | TARGET FILE PATH | TARGET EVENT | ASYNCHRONOUS PROCESS CODE ID | EXECUTION ENVIRONMENT ID |
|---|---|---|---|---|
| 1 | logdata/client1 | add | 1 | 1 |

According to the event settings table of Table 20, the settings are such that an event occurs when a file is "added" to the file path "logdata/client1", and asynchronous process code having an asynchronous process code ID of 1 is executed in an execution environment having an ID of 1. In other words, this means that the asynchronous process code "FuncB" is executed upon the file server 102 receiving a file of log information from the client device 101. Event-driven processing starting from the uploading of a log file will be described hereinafter using FIGS. 17A and 17B. Processes having the same step numbers as those in FIGS. 13A and 13B means that the same processes as those in FIGS. 13A and 13B are carried out.

In step S1701, the client device 101 sends a log file to the file server 102.

In step S1702, the file server 102 sends event information to the event information management server 104. Table 21 is an example of the event information issued in step S1702. The event information in Table 21 indicates the file path of the log file, and that the event type is "add".

TABLE 21

File Upload Completion Event

| FILE PATH | EVENT TYPE |
|---|---|
| logdata/client1/201601.log | add |

In step S1703, the asynchronous process code execution management application 710 confirms the event details. Here, a record corresponding to the event shown in Table 21 is present in the event settings table shown in Table 20, and thus the corresponding asynchronous process code "FuncB" is executed. Accordingly, in step S1704, the code "FuncB" is sent to the execution unit 722, and the execution of that code is requested. In step S1731, the asynchronous process code "FuncB" is executed. The processes of step S1703 to step S1704 are the same as the processes of step S1114 to step S1120. Although not indicated here, steps S1115, S1116, S1117, S1118, and S1119 are also executed, and furthermore, step S1121 is executed after step S1120. In other words, it is determined whether or not the number of instances of asynchronous process code executed is within the permitted range, and the asynchronous process code is executed in the case where the number is determined to be within the permitted range. The execution state of the asynchronous process code is also monitored. This is the same as when other files are uploaded as well.

Figure 15:
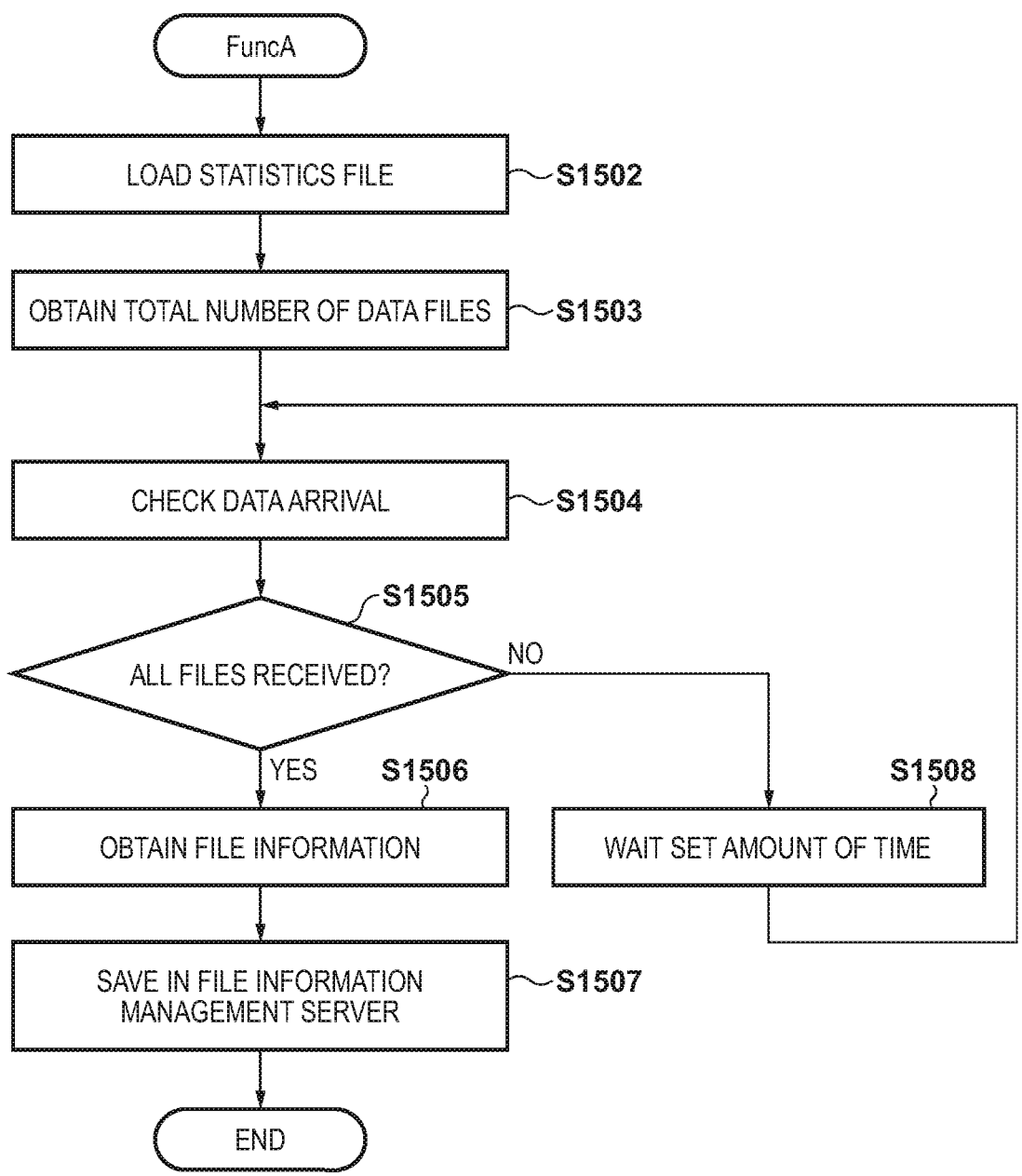
FIG. 15 is a flowchart of asynchronous process code "FuncA".
Figure 18:
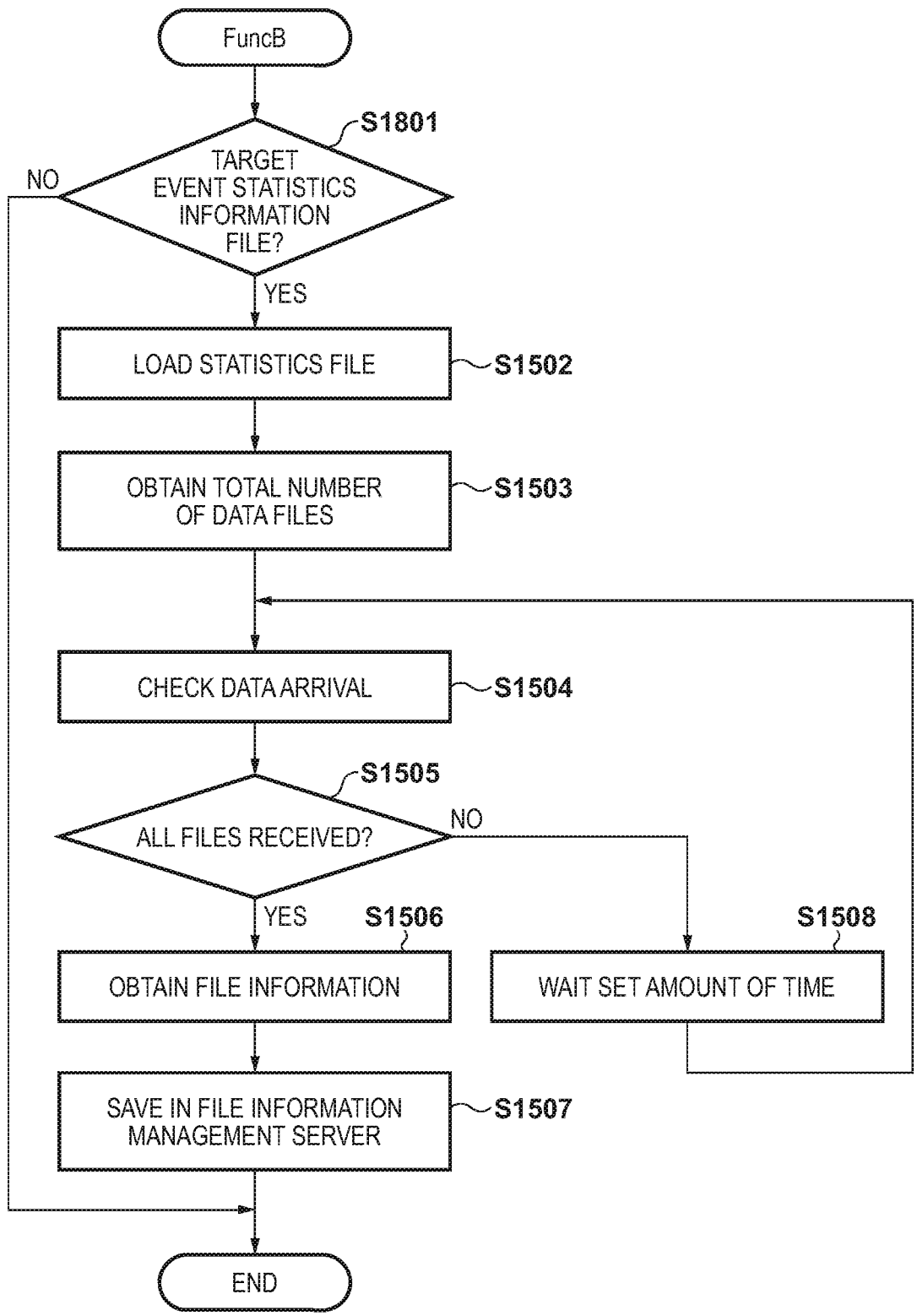
FIG. 18 is a flowchart of asynchronous process code "FuncB".

The processing of the asynchronous process code "FuncB" will be described in detail using FIG. 18. In step S1801, it is determined whether or not the target file for the received event is the statistics information file. In the case of a determination of "yes", the process advances to step S1502, and the processing illustrated in FIG. 15 is carried out thereafter (steps having the same numbers as in FIG. 15 indicate the same processes as those in FIG. 15). In the case of a determination of "no" in step S1801, the file is not the statistics information file (that is, the file is a log file), and thus the asynchronous process code "FuncB" is ended immediately in step S1731. In the case where the determination is made to end the code, the execution unit 722 returns a response to the asynchronous process code execution management application 710.

In step S1705, the asynchronous process code execution management application 710 discards the asynchronous process code execution environment for the execution unit 722. Accordingly, even if the asynchronous process code "FuncB" is executed, the code will be discarded in a short amount of time in the case where the target is a log file.

Next, assume that the client device 101 has sent the statistics information file in step S1711. The processes of step S1712 to step S1714 are the same as the processes of step S1702 to step S1704. Here, a new execution environment is constructed, and the asynchronous process code "FuncB" is started. The file is the statistics information file, and thus a determination of "yes" is made in step S1801 of FIG. 18; thereafter, the same processing as that illustrated in FIG. 15, described with reference to the first embodiment, is executed. In other words, when checking for the arrival in step S1332, the file has not yet arrived, and thus the process waits (S1505→S1508) and then returns once again to the checking process. All of the log files are present as a result of step S1721, and thus registration information is stored in the file information management server 103 in step S1335 as a result of the checking for the arrival carried out in step S1333.

According to the processing described thus far, asynchronous process code corresponding to a log file can be executed in an extremely short amount of time, even when the statistics information file in the log file have the same storage location. Accordingly, the risk that event processing cannot be carried out due to the number of instances of asynchronous process code started reaching the permitted upper limit can be reduced.

Third Embodiment

As illustrated in FIG. 12, the asynchronous process code execution environment management unit 714 monitors the execution time of each instance of asynchronous process code executed in the asynchronous process code execution environment 720. When the processing is not completed within the set amount of time, a timeout error occurs, and the execution of asynchronous process code is interrupted. In the first or second embodiment, there is a problem in that the process for updating the information in the file information management server 103 cannot be carried out unless it can be confirmed that all of the associated log files have arrived before the asynchronous process code "FuncA" or "FuncB" times out. This embodiment describes a method for extending the total processing time of the asynchronous process code to a desired amount of time in order to solve this problem. Hereinafter, in this embodiment, it is assumed that the processing is carried out using the following settings, conditions, and so on.

First, with respect to the file storage locations, the event processing may be divided according to filename or the like and carried out only for the statistics information file as in the first embodiment, or the event processing may be carried out for all files as in the second embodiment. It is assumed here that at least the statistics information file is subject to the event processing. Table 22 shows an example of the asynchronous process code management table according to this embodiment.

TABLE 22

Asynchronous Process Code Management Table

| ID | FILENAME | FILE DATA |
|----|----------|-----------|
| 1 | FuncC1.zip | <binary data> |
| 2 | FuncC2.zip | <binary data> |
| 3 | FuncC3.zip | <binary data> |
| : | : | : |
| X | FuncCx.zip | <binary data> |

Thus according to this embodiment, the event-driven scripts are divided into a plurality of sequences (called "routines" here), and it is assumed that asynchronous process code "FuncCn" is registered here. Only FuncC1, having an ID of 1, is executed in a file arrival event, and the asynchronous process code registered for IDs of 2 and higher are executed from other asynchronous process code. The flow of processing of FuncCn will be described later with reference to FIGS. 20A, 20B and 20C. Table 23 shows an event settings table according to this example.

TABLE 23

Event Settings Table

| ID | TARGET FILE PATH | TARGET EVENT | ASYNCHRONOUS PROCESS CODE ID | EXECUTION ENVIRONMENT ID |
|----|------------------|--------------|------------------------------|--------------------------|
| 1 | logdata/client1 | add | 1 | 1 |

Figure 17A:
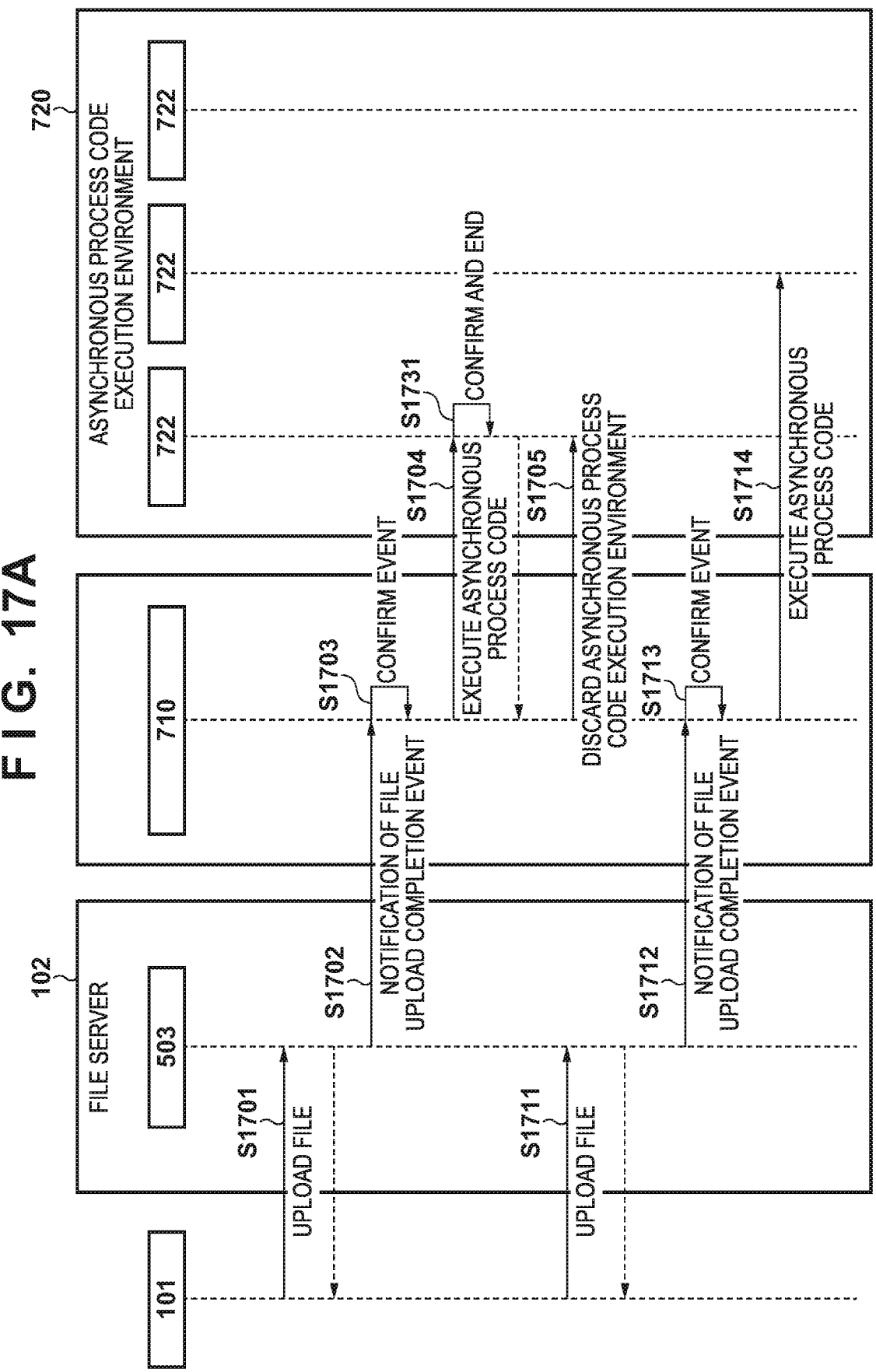
Figure 19A:
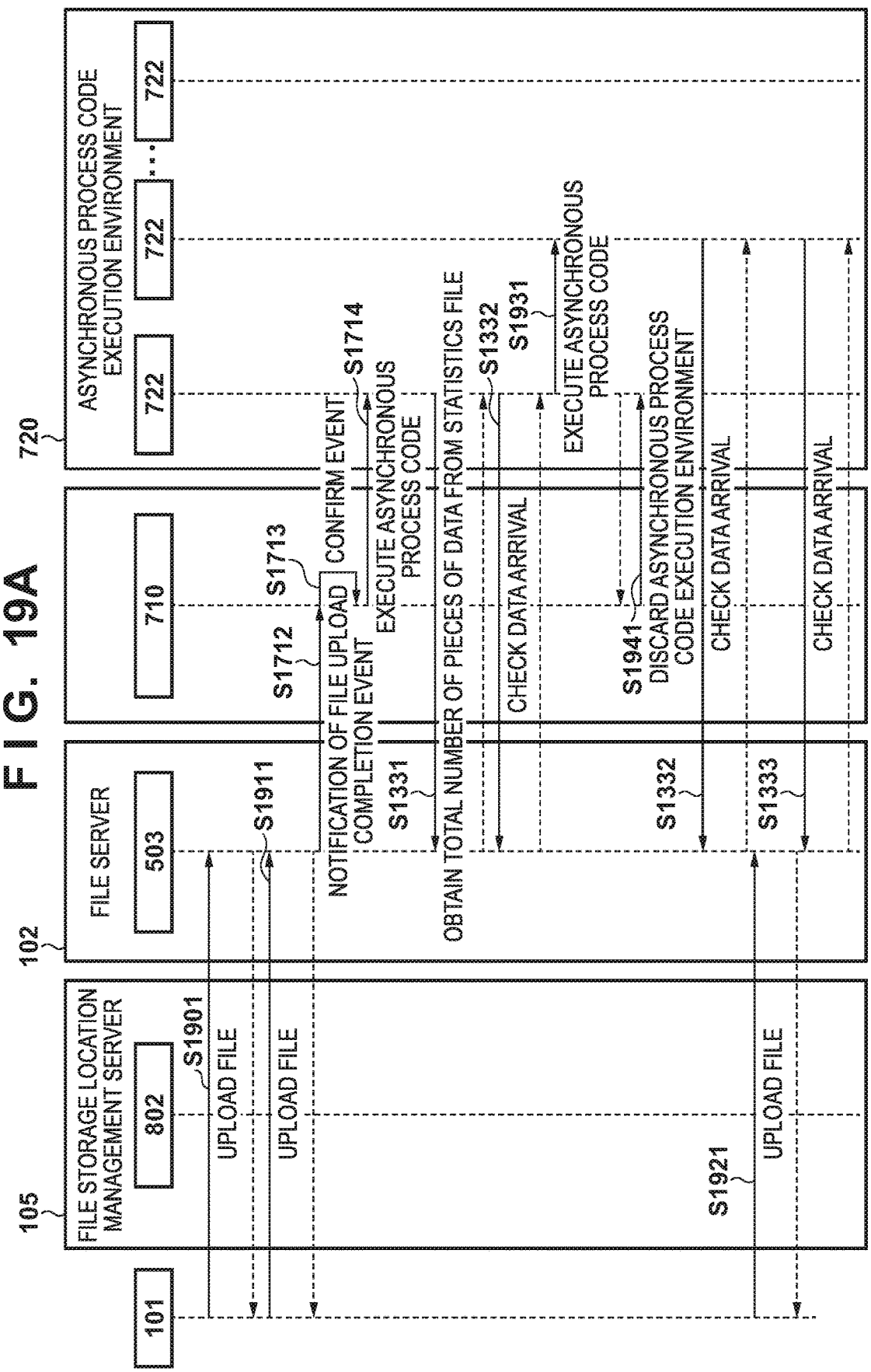

According to this event settings table, the settings are such that an event occurs when a file is "added" to the file path "logdata/client1", and asynchronous process code having an asynchronous process code ID of 1 is executed in an execution environment having an ID of 1. In other words, this means that the asynchronous process code "FuncC1" is executed upon the file server 102 receiving a log file, the statistics information file, or the like from the client device 101. Processing will be described hereinafter using FIGS. 19A and 19B. Processes having the same step numbers as those in FIGS. 13A, 13B, 17A, and 17B means that the same processes as those in those drawings are carried out. Steps S1116 and S1117, in which whether or not the asynchronous process code being executed has exceeded the upper limit value is checked, and which are omitted from FIGS. 17A and 17B, are also omitted here.

In step S1901, a log file is sent from the client device 101. The asynchronous process code "FuncC1" is executed in response to the log file being uploaded, but is ended and discarded immediately after being executed. This will be described with reference to FIG. 20A. Note that the sequence for ending and discarding the asynchronous process code has also been omitted here.

In step S1911, the statistics information file is sent from the client device 101. The asynchronous process code "FuncC1" is executed through step S1912 to step S1914. The processing of the asynchronous process code "FuncC1" will be described in detail using FIG. 20A. Processes having the same step numbers as those in FIGS. 15, 18, or the like means that the same processes as those in those drawings are carried out. In the case where the file is determined to be a log file in step S1801, the process ends immediately. In step S2001, a timer in which a predetermined expiration time has been set is started. This is used by the asynchronous process code "FunC1" to measure the amount of time until that code itself times out. It is desirable that the elapsed time measured here is set to a value that does not exceed the execution time checked in step S1203 of FIG. 12, for example. This is because the asynchronous process code being executed will be forcibly terminated if that amount of time is exceeded.

In the case of a determination of "no" in step S1505, or in other words, in the case where it is determined that the files are not all present, the process advances to step S2002. In step S2002, the timer started in step S2001 is checked, and it is determined whether or not there is still time until a timeout. Here, for example, it may be determined whether or not the execution time that has passed following the start of execution in FIG. 20A has reached a predetermined amount of time. Here, if there is still time left for the waiting of step S1508, the file checking of step S1504, and the file information updating of step S1507, a determination of "yes" is made, whereas if there is no time left, a determination of "no" is made. In the case of a determination of "yes" in step S2002, or in other words, in the case where it has been determined that the asynchronous process code "FuncC1" being executed may be completed, the process advances to step S1508, where the file checking is repeated after waiting for a set amount of time. In the case of a determination of "no" in step S2002, or in other words, in the case where it is determined that the asynchronous process code "FuncC1" is unlikely to be completed, the process advances to step S2003, where the asynchronous process code "FuncC2" is started. Here, the asynchronous process code "FuncC1" sends an execution environment start request to the asynchronous process code execution management application 710 via the execution unit 722. Table 24 shows an example of the execution environment start request.

TABLE 24

Execution Environment Start Request

| ASYNCHRONOUS PROCESS CODE ID | EXECUTION ENVIRONMENT ID | FILE PATH |
|---|---|---|
| 2 | 1 | logdata/client1/stat.txt |

In Table 24, the "asynchronous process code ID" column that holds an ID for specifying the asynchronous process code management asynchronous process code management table indicated in Table 22. The ID of 2 indicates a request to start "FuncC2". The "execution environment ID" column is a column that holds an ID for specifying the execution environment to be used, from the execution environment indicated in Table 4. The "file path" column is a column that holds the file path to be passed to the asynchronous process code to be started. On the basis of the received request, the asynchronous process code execution management application 710 requests the execution unit 722 to construct a new execution environment and execute the requested asynchronous process code. The process of starting the asynchronous process code "FuncC2" from the asynchronous process code "FuncC1" refers to the process of step S1931 in FIG. 19A. This completes the processing illustrated in FIG. 20A.

Upon the asynchronous process code "FuncC1" ending, in step S1941, the asynchronous process code execution management application 710 discards the asynchronous process code execution environment for the execution unit 722.

Figure 20A:
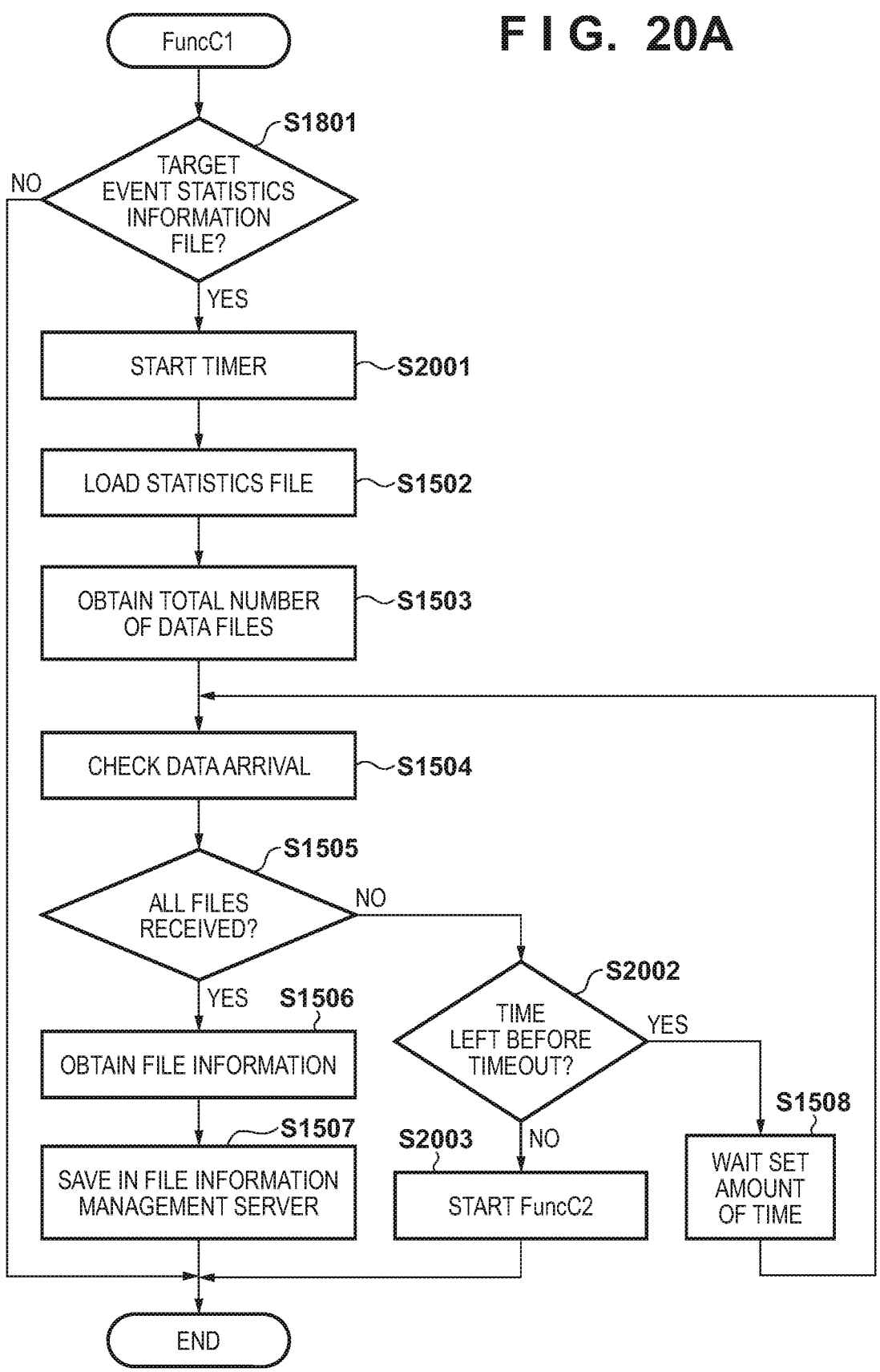
FIGS. 20A, 20B, and 20C are flowcharts of asynchronous process code "FuncC".
Figure 20B:
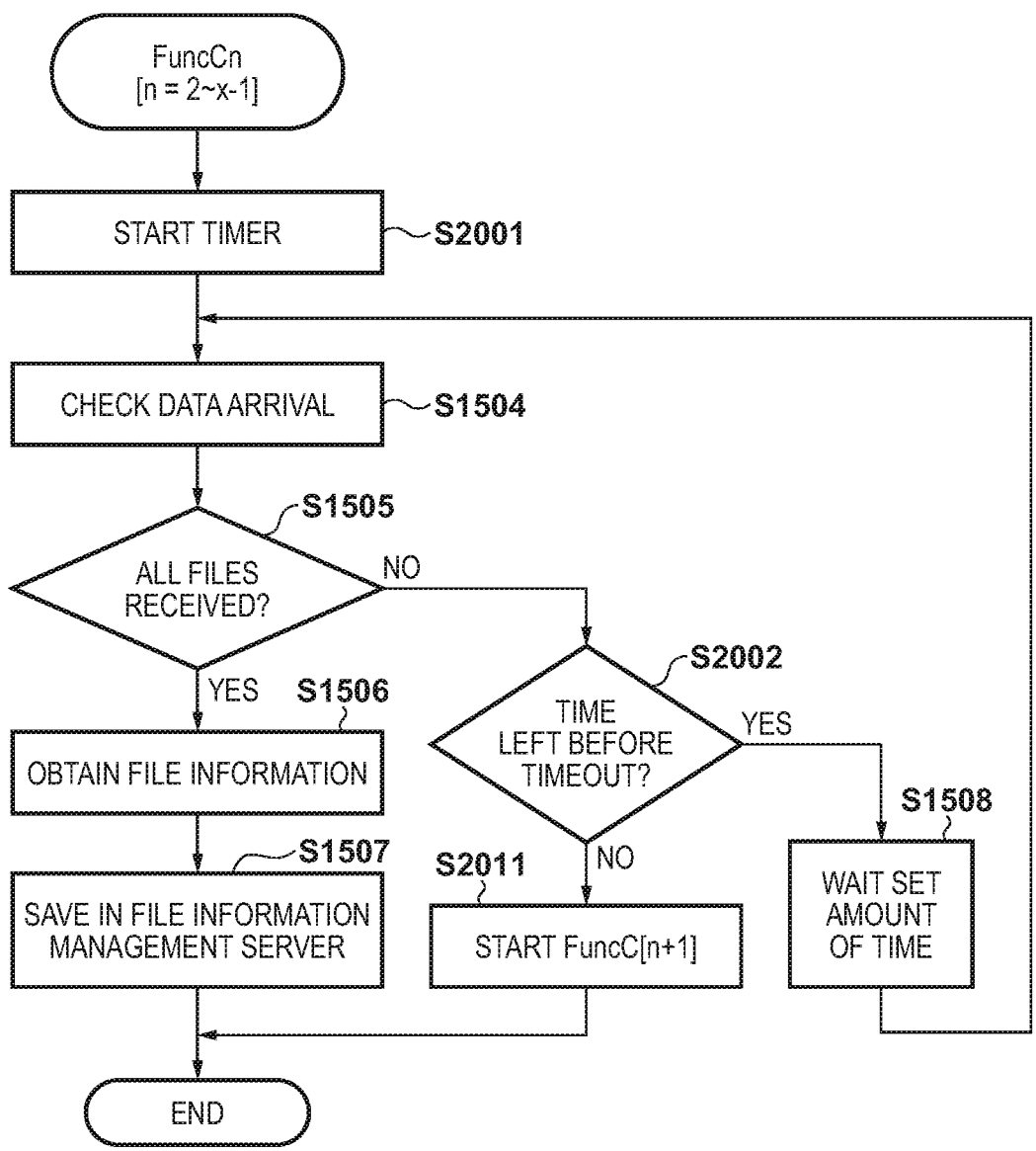

FIG. 20B is a diagram illustrating the flow of the processing of the asynchronous process code "FuncC2". Processes having the same step numbers as those in FIG. 20A means that the same processes as those in FIG. 20A are carried out. The differences are that steps S1801, S1502, and S1503 are not included, and that step S2011 is executed instead of step S2003. In step S2002, in the case where it is determined that the asynchronous process code "FuncC2" cannot be completed before a timeout, the next "FuncC3" is started, and "FuncC2" ends (step S1933 of FIG. 19B indicates this). Thereafter, "FuncC4" and "FuncC5" can be relayed the necessary number of times. This means that assuming that each instance of asynchronous process code has a timeout time of 60 seconds, and this relay is carried out five times, approximately five minutes' worth of continuous processing can be carried out.

Figure 20C:
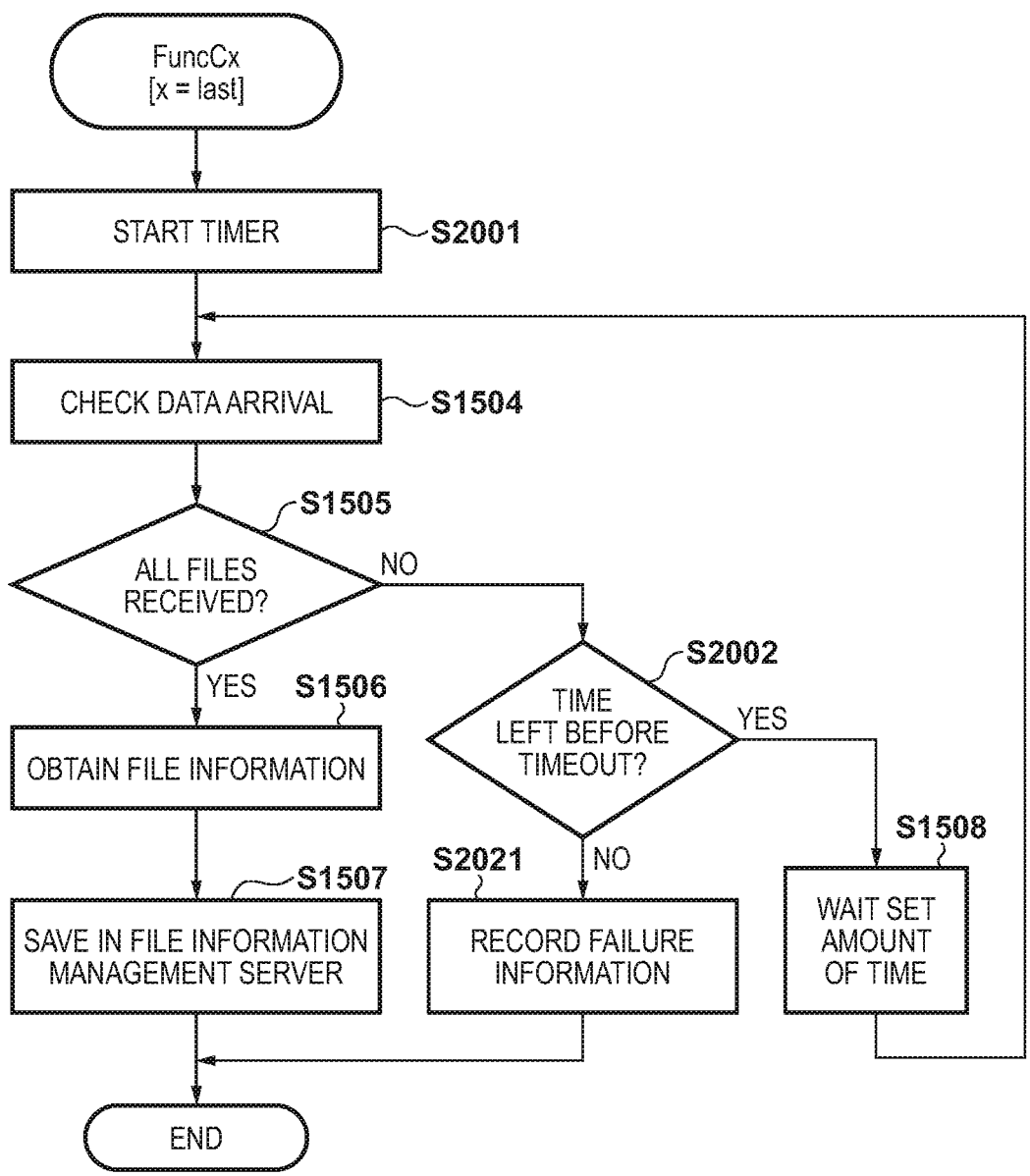

FIG. 20C illustrates a sequence of the final asynchronous process code "FuncCx" for carrying out the series of processes. Processes having the same step numbers as those in FIG. 20B means that the same processes as those in FIG. 20B are carried out. The only difference is that step S2021 is executed instead of step S2011. In step S2021, when it is determined that a timeout has also occurred in "FuncCx", failure information is recorded in that code (step S1934 of FIG. 19B also indicates this). As a result, rather than leaving the process to the system, the code can make use of its own retry processing.

The environment is discarded after the asynchronous process codes have ended (steps S1341 and S1942).

As described thus far, by executing an instance of asynchronous process code from a different instance of asynchronous process code, the time at which a timeout occurs can be extended to a desired time, even for an event-driven computing service that times out. Furthermore, by writing error information with the final instance of asynchronous process code, it becomes easier for vendors to control their own particular recovery processes when there is ultimately a timeout.

The foregoing descriptions are based on the second embodiment, but the descriptions may be based on the first embodiment instead. In this case, the event serving as a trigger for the asynchronous process code is only the statistics information file being uploaded. Accordingly, step S1801 in FIG. 20A can be (may be) omitted.

Fourth Embodiment

The third embodiment describes a method for handling a case where the arrival of all log files cannot be confirmed before a timeout. However, even if the arrival (upload) of all of the log files to the file server 102 has been confirmed before the timeout, it is possible that a timeout will occur in the processing that follows thereafter if there is not enough time left at that time. In this case, there is a problem that the process of updating information in the file information management server 103 will fail. This embodiment describes a method in which processing is relayed to asynchronous process code that carries out specific processing (updating information in the file information management server 103) in order to solve this problem. Hereinafter, in this embodiment, it is assumed that the processing is carried out using the following settings, conditions, and so on. First, the conditions with respect to the file storage locations are the same as in the third embodiment. Table 25 shows an asynchronous process code management table.

TABLE 25

Asynchronous Process Code Management Table

| ID | FILENAME | FILE DATA |
|----|----------|-----------|
| 1 | FuncD.zip | <binary data> |
| 2 | FuncE.zip | <binary data> |

Figure 22:
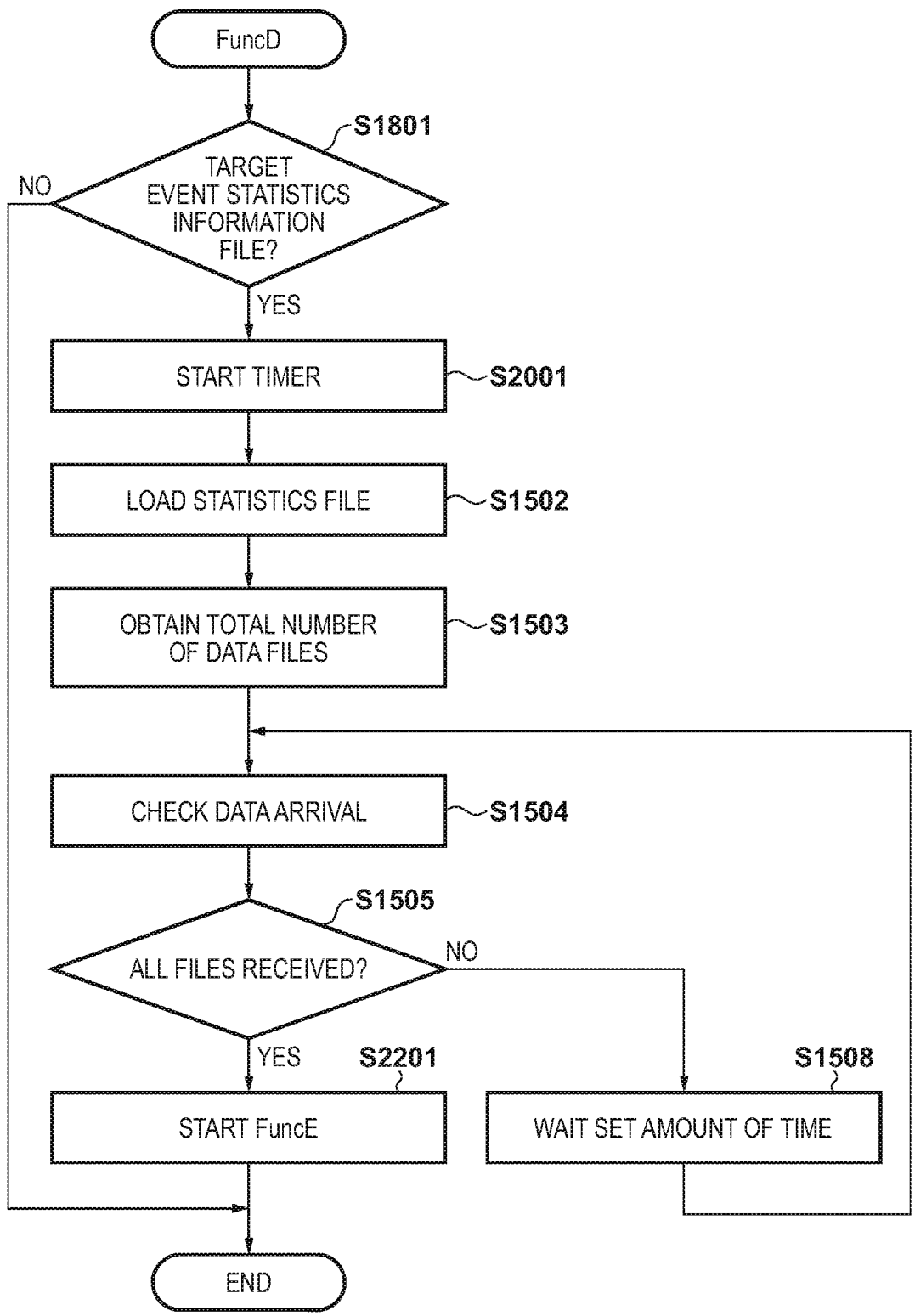
FIG. 22 is a flowchart of asynchronous process code "FuncD".

As indicated in Table 25, it is assumed that asynchronous process code "FuncD" and "FuncE" are registered. In a file arrival event, only FuncD, having an ID of 1, is executed, and the asynchronous process code for which an ID of 2 is registered is executed from "FuncD". The flow of processing of "FuncD" and "FuncE" will be described later with reference to FIGS. 22 and 23. Table 26 shows an event settings table.

TABLE 26

Event Settings Table

| ID | TARGET FILE PATH | TARGET EVENT | ASYNCHRONOUS PROCESS CODE ID | EXECUTION ENVIRONMENT ID |
|----|------------------|--------------|------------------------------|--------------------------|
| 1 | logdata/client1 | add | 1 | 1 |

Figure 21:
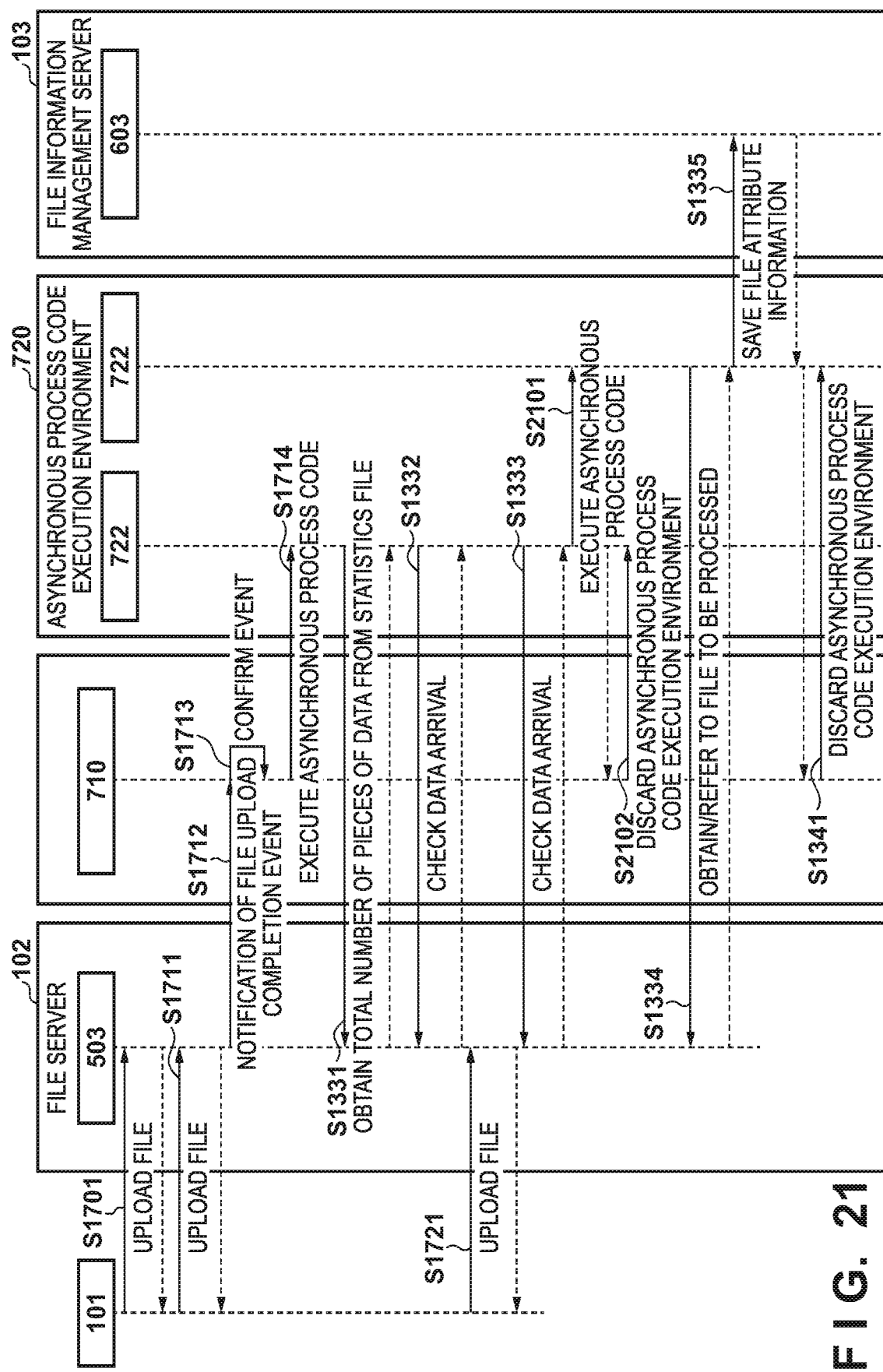
FIG. 21 is a sequence chart illustrating a fourth embodiment.

According to Table 26, the settings are such that an event occurs when a file is "added" to the file path "logdata/client1", and asynchronous process code having an asynchronous process code ID of 1 is executed in an execution environment having an ID of 1. In other words, this means that the asynchronous process code "FuncD" is executed upon the file server 102 receiving a file such as a log file or the statistics information file from the client device 101. Processing will be described hereinafter using FIG. 21. Processes having the same step numbers as those in FIG. 17A or 17B means that the same processes as those in FIG. 17A or 17B are carried out. Like FIGS. 17A and 17B, the checking of the number of instances of the asynchronous process code being executed has been omitted.

Only the points different from FIGS. 17A and 17B will be described here. The asynchronous process code started by step S1714 is "FuncD", based on Table 25. Details of the processing of "FuncD" will be described using FIG. 22. Processes having the same step numbers as those in FIG. 18 means that the same processes as those in FIG. 18 are carried out. The difference is that step S2201 is carried out instead of steps S1506-S1507. In the case where it is determined in step S1505 that all of the files are present, the asynchronous process code "FuncE" is started in step S2201. With respect to the starting method, the execution environment start request is sent, in the same manner as in the third embodiment. Table 27 shows an example of the execution environment start request.

TABLE 27

Execution Environment Start Request

| ASYNCHRONOUS PROCESS CODE ID | EXECUTION ENVIRONMENT ID | FILE PATH |
|------------------------------|--------------------------|-----------|
| 2 | 1 | logdata/client1/stat.txt |

Based on the above request, "FuncE", corresponding to an ID of 2 in Table 25, is started. Step S2101 of FIG. 21 indicates the starting of "FuncE". After "FuncE" has been started, in step S2102, the environment of the asynchronous process code "FuncD" is discarded.

Figure 23:
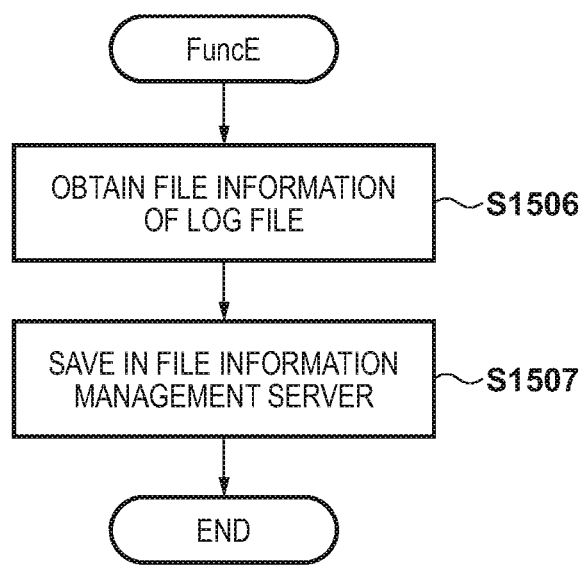
FIG. 23 is a flowchart of asynchronous process code "FuncE".

FIG. 23 is a diagram illustrating the processing of "FuncE" in detail. The processing carried out in steps S1506 and S1507 of FIG. 15 is carried out here. Steps S1334 and S1335 in FIG. 21 indicate this.

As described above, by dividing the collective processing carried out on a series of related files, the risk that processing will fail due to timeout errors is reduced. This is because the obtainment and saving of the information of the log files carried out in steps S1506 and S1507 is carried out by the separate asynchronous process code "FuncE", which has been started anew.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-208846, filed Oct. 25, 2016, which is hereby incorporated by reference herein in its entirety.

What is claimed is:

1. An information processing method in a system that provides a service that in response to a system event automatically executes a script registered in advance with computing resources designated for the script, the method comprising:
 detecting the system event related to a reception of first data;
 executing the script in response to the detected system event;
 in a case where it is determined that the first data is not predetermined data, ending processing according to the script in response to the determination;

detecting the system event related to a reception of second data;

executing the script in response to the detected system event; and in a case where it is determined that the second data is the predetermined data, controlling the processing for the second data according to the script, wherein the control of the processing according to the script includes starting a different script and then ending the processing according to the script.

2. A system that provides a service that in response to a system event automatically executes a script registered in advance with computing resources designated for the script, the system comprising one or more processors executing instructions causing the system to:

detect the system event related to a reception of first data;

execute the script in response to the detected system event;

in a case where it is determined that the first data is not predetermined data, end processing according to the script in response to the determination;

detect the system event related to a reception of second data;

execute the script in response to the detected system event; and in a case where it is determined that the second data is the predetermined data, control the processing for the second data according to the script, wherein the control of the processing according to the script includes starting a different script then ending the processing according to the script.

3. The system according to claim 2, wherein, according to the started different script, processing for at least the first data is performed.

4. The system according to claim 2, wherein the script is ended once an execution time of the script has reached a predetermined time.

5. The system according to claim 2, wherein the script is executed by starting a virtual machine according to computing resources in response to the detected system event.

6. The system according to claim 5, wherein the different scrip is executed by further starting a virtual machine.

7. A non-transitory computer-readable medium storing a program executed by a computer included in a system in accordance with a system event and computing resources specified during registration in the system, wherein when the program is executed by the computer, and the program is executed in response to each of a plurality of system events occurring in response to a plurality of pieces of related data being received, the program:

ending, in a case where it is determined that first data corresponding to the system event that has triggered the execution of the program is not predetermined data, processing according to the executed program in response to the determination; and controlling, in a case where it is determined that second data corresponding to the system event that has triggered the execution of the program is predetermined data, the processing for the second data according to the executed program, wherein the control of the processing according to the executed program includes starting a different program and the ending the processing according to the executed program.

8. The medium according to claim 7, wherein processing for at least the first data is performed according to the started different program.

9. The medium according to claim 7, wherein the predetermined data includes statistics information pertaining to the plurality of pieces of data, and the controlling of the processing is based on the statistics information.

10. The medium according to claim 7, wherein the system event includes uploading data to the system.

* * * * *